(12) United States Patent
Tsuda et al.

(10) Patent No.: US 12,087,160 B2
(45) Date of Patent: Sep. 10, 2024

(54) TRAFFIC CONTROL SYSTEM, TRAFFIC CONTROL METHOD, AND CONTROL APPARATUS

(71) Applicant: SONY GROUP CORPORATION, Tokyo (JP)

(72) Inventors: Shinichiro Tsuda, Kanagawa (JP); Hiromasa Uchiyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 302 days.

(21) Appl. No.: 17/636,238

(22) PCT Filed: Sep. 23, 2020

(86) PCT No.: PCT/JP2020/035824
§ 371 (c)(1),
(2) Date: Feb. 17, 2022

(87) PCT Pub. No.: WO2021/065626
PCT Pub. Date: Apr. 8, 2021

(65) Prior Publication Data
US 2022/0335826 A1    Oct. 20, 2022

(30) Foreign Application Priority Data
Sep. 30, 2019  (JP) .................. 2019-178464

(51) Int. Cl.
*G08G 1/09*       (2006.01)
*B60W 30/18*      (2012.01)
(Continued)

(52) U.S. Cl.
CPC ....... *G08G 1/096775* (2013.01); *B60W 30/18* (2013.01); *B60W 40/04* (2013.01); *G06Q 40/08* (2013.01); *G08G 1/096708* (2013.01); *B60W 2554/802* (2020.02); *B60W 2555/60* (2020.02); *B60W 2556/45* (2020.02)

(58) Field of Classification Search
CPC ....... G08G 1/096775; G08G 1/096708; G08G 1/096725; G08G 1/096741; G08G 1/09675; G08G 1/166; B60W 30/18; B60W 40/04; B60W 2554/802; B60W 2555/60;
(Continued)

(56) References Cited
U.S. PATENT DOCUMENTS
2019/0184993 A1*  6/2019  Wigard ................. B60W 30/16
2021/0070292 A1*  3/2021  Jornod ................. B60W 30/162

FOREIGN PATENT DOCUMENTS
JP   2009-128486 A   6/2009
JP   2012-123625 A   6/2012
(Continued)

*Primary Examiner* — Michael V Kerrigan
(74) *Attorney, Agent, or Firm* — Paratus Law Group, PLLC

(57) ABSTRACT

A traffic control system includes an identification unit (234) that identifies a vehicle falling under a predetermined condition that has been set, a position control unit (235) that sets a relative position between the vehicle identified and a surrounding vehicle around the vehicle based on a relative distance between the vehicle and the surrounding vehicle, and a control unit (230) that generates control information for controlling movement of the vehicle according to the set relative position.

19 Claims, 18 Drawing Sheets

(51) Int. Cl.
  *B60W 40/04*   (2006.01)
  *G06Q 40/08*   (2012.01)
  *G08G 1/0967*  (2006.01)

(58) Field of Classification Search
  CPC ........ B60W 2556/45; B60W 2554/801; G06Q 40/08; H04W 4/46; H04W 4/44; G01C 21/3461
  See application file for complete search history.

(56)     References Cited

FOREIGN PATENT DOCUMENTS

| | | |
|---|---|---|
| JP | 2014-071839 A | 4/2014 |
| JP | 2014-089556 A | 5/2014 |
| JP | 2017-167795 A | 9/2017 |
| JP | 2018-132909 A | 8/2018 |
| WO | WO 2015/159362 A1 | 10/2015 |
| WO | WO 2019/039212 A1 | 2/2019 |

\* cited by examiner

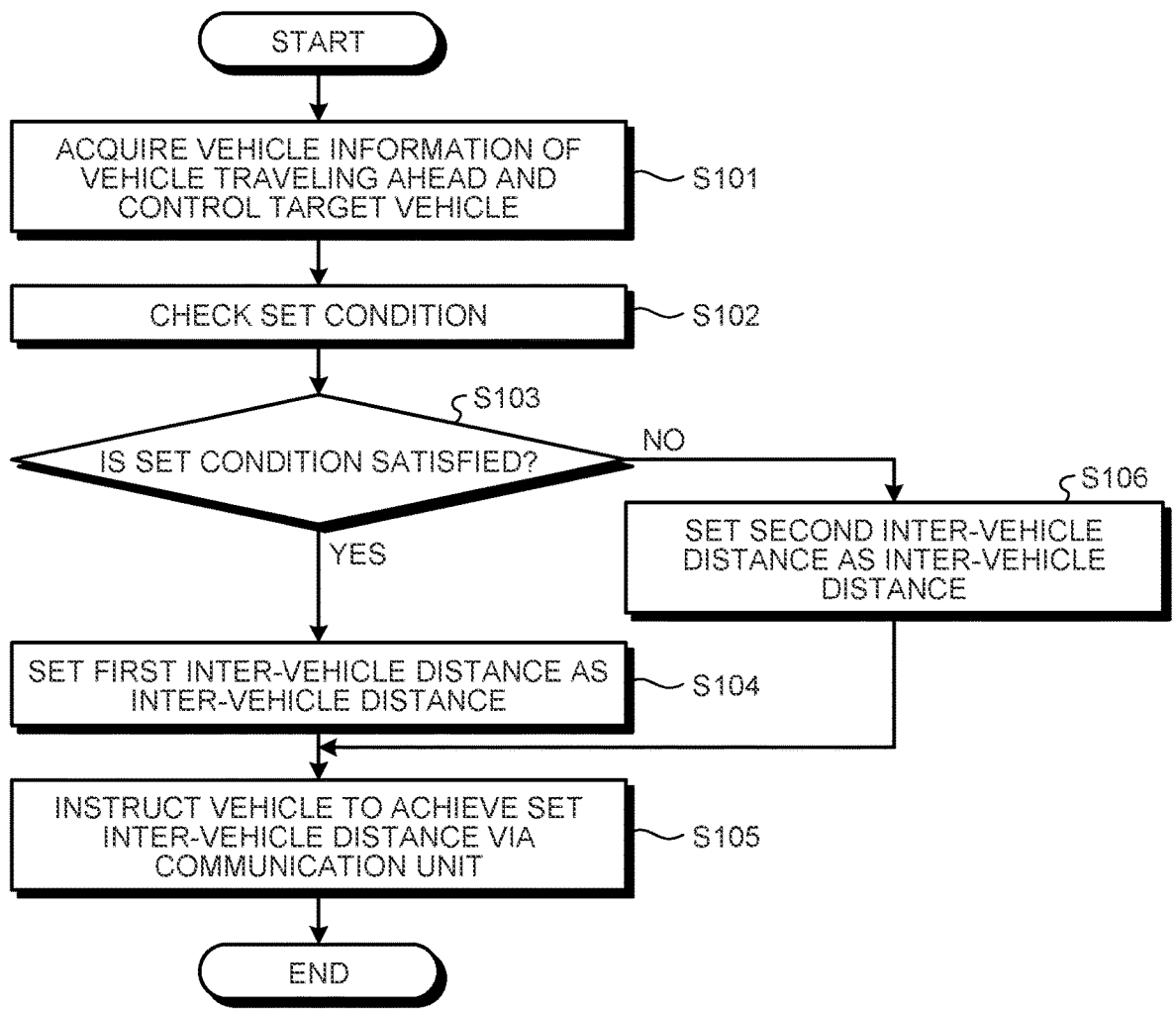

FIG.5

| CONDITION | DESCRIPTION |
|---|---|
| CONDITION C1 | VEHICLE TRAVELING AHEAD IS NOT COVERED BY INSURANCE WITH PREDETERMINED COMPENSATION AMOUNT OR HIGHER WITH RESPECT TO THIRD-PARTY DAMAGE, PROPERTY DAMAGE, PERSONAL INJURY, PASSENGER INJURY, OR THE LIKE |
| CONDITION C2 | VEHICLE TRAVELING AHEAD IS NOT EQUIPPED WITH DRIVING SUPPORT APPARATUS AT CERTAIN TECHNICAL LEVEL OR HIGHER |
| CONDITION C3 | LEGAL SPEED OF ROAD ON WHICH VEHICLE IS TRAVELING IS 60 km/h OR HIGHER |

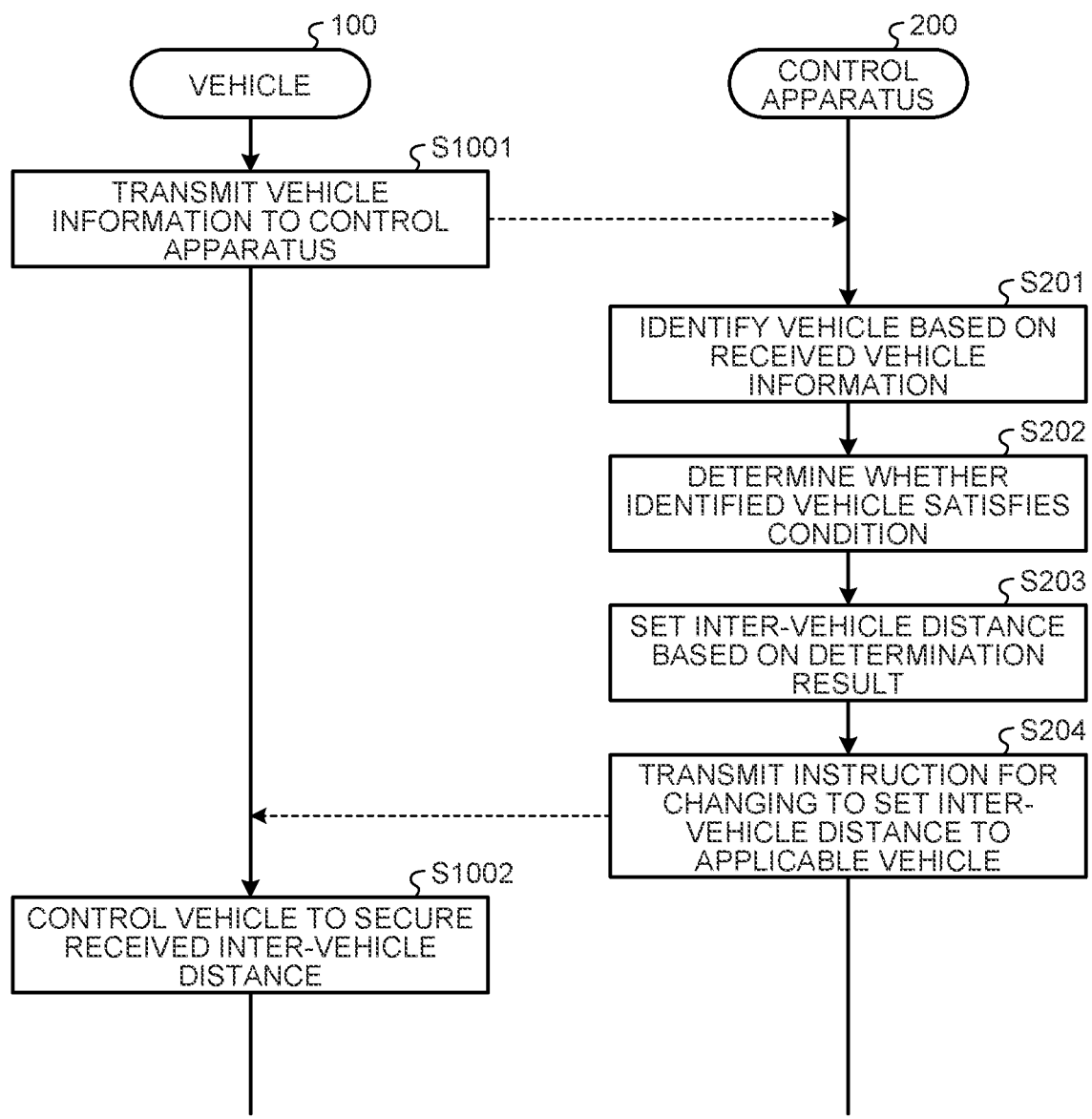

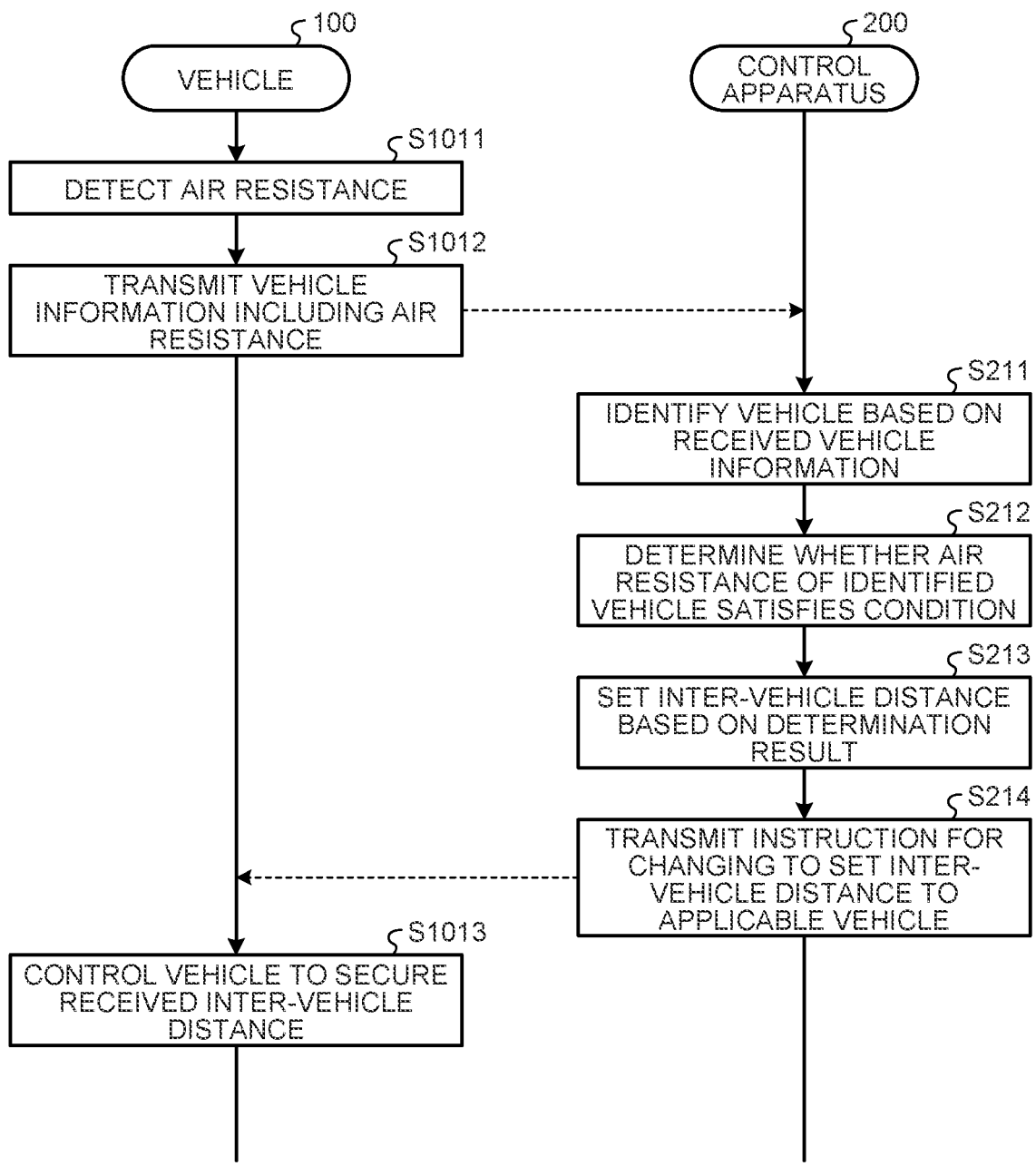

TRAFFIC CONTROL SYSTEM, TRAFFIC CONTROL METHOD, AND CONTROL APPARATUS

CROSS REFERENCE TO PRIOR APPLICATION

This application is a National Stage patent application of PCT International Patent Application No. PCT/JP2020/035824 (filed on Sep. 23, 2020) under 35 U.S.C. § 371, which claims priority to Japanese Patent Application No. 2019-178464 (filed on Sep. 30, 2019), which are all hereby incorporated by reference in their entirety.

FIELD

The present disclosure relates to a traffic control system, a traffic control method, and a control apparatus.

BACKGROUND

In recent years, various sensors have been mounted on vehicles, and functions for assisting driving have been introduced. Patent Literature 1 discloses a technique of calculating an inter-vehicle distance on the basis of position information of an own vehicle and position information of another vehicle, and correcting the inter-vehicle distance on the basis of speed information of the own vehicle and another vehicle.

CITATION LIST

Patent Literature

Patent Literature 1: JP 2014-071839 A

SUMMARY

Technical Problem

In the related art described above, it is desired to support a traffic of a plurality of vehicles even when vehicles having different driving levels, autonomous vehicles, and the like are mixed.

Therefore, the present disclosure provides a traffic control system, a traffic control method, and a control apparatus capable of controlling traffic of vehicles having different driving levels.

Solution to Problem

To solve the problems described above, a traffic control system according to an embodiment of the present disclosure includes: an identification unit that identifies a vehicle falling under a predetermined condition that has been set; a position control unit that sets a relative position between the vehicle identified and a surrounding vehicle around the vehicle based on a relative distance between the vehicle and the surrounding vehicle; and a control unit that generates control information for controlling movement of the vehicle according to the relative position.

Moreover, a traffic control method according to an embodiment of the present disclosure causes a computer to implement: identifying a vehicle falling under a predetermined condition that has been set; setting a relative position between the vehicle identified and a surrounding vehicle around the vehicle based on a relative distance between the vehicle and the surrounding vehicle; and generating control information for controlling movement of the vehicle according to the relative position.

Moreover, a control apparatus according to an embodiment of the present disclosure includes: an identification unit that identifies a vehicle falling under a predetermined condition that has been set; and a position control unit that sets a relative position between the vehicle identified and a surrounding vehicle around the vehicle based on a relative distance between the vehicle and the surrounding vehicle, wherein the position control unit controls movement of the vehicle so as to achieve the relative position set.

BRIEF DESCRIPTION OF DRAWINGS

FIG. 4 is a flowchart illustrating an example of a process procedure of the control apparatus according to the embodiment.

FIG. 5 is a table illustrating an example of condition information according to the embodiment.

FIG. 6 is a sequence diagram illustrating an example of an operation of the traffic control system according to the embodiment.

FIG. 7 is a sequence diagram illustrating another example of the operation of the traffic control system according to the embodiment.

DESCRIPTION OF EMBODIMENTS

Hereinafter, embodiments of the present disclosure will be described with reference to the drawings. In each of the following embodiments, same parts are given the same reference signs to omit redundant description.

In recent years, various sensors are mounted on vehicles, and functions for assisting driving are being introduced. In the Institute of Electrical and Electronics Engineers (IEEE), a communication system for inter-vehicle communication called the dedicated short range communication (DSRC) based on 802.11p has been formulated. Further, in the third generation partnership project (3GPP), in Release 14, the C-V2X standard based on a long term evolution (LTE) device to device (D2D) communication has been created. Introduction of an advanced safe driving system called advanced driver assistance systems (ADAS) by inter-vehicle communication and sensor fusion utilizing various sensors mounted on a vehicle is expected. Furthermore, the advent of a fully automated driving world is also expected after the evolution of ADAS. The present disclosure discloses a traffic control method and the like for supporting safe driving.

Embodiment

Outline of Traffic Control System According to Embodiment

Figure 1:
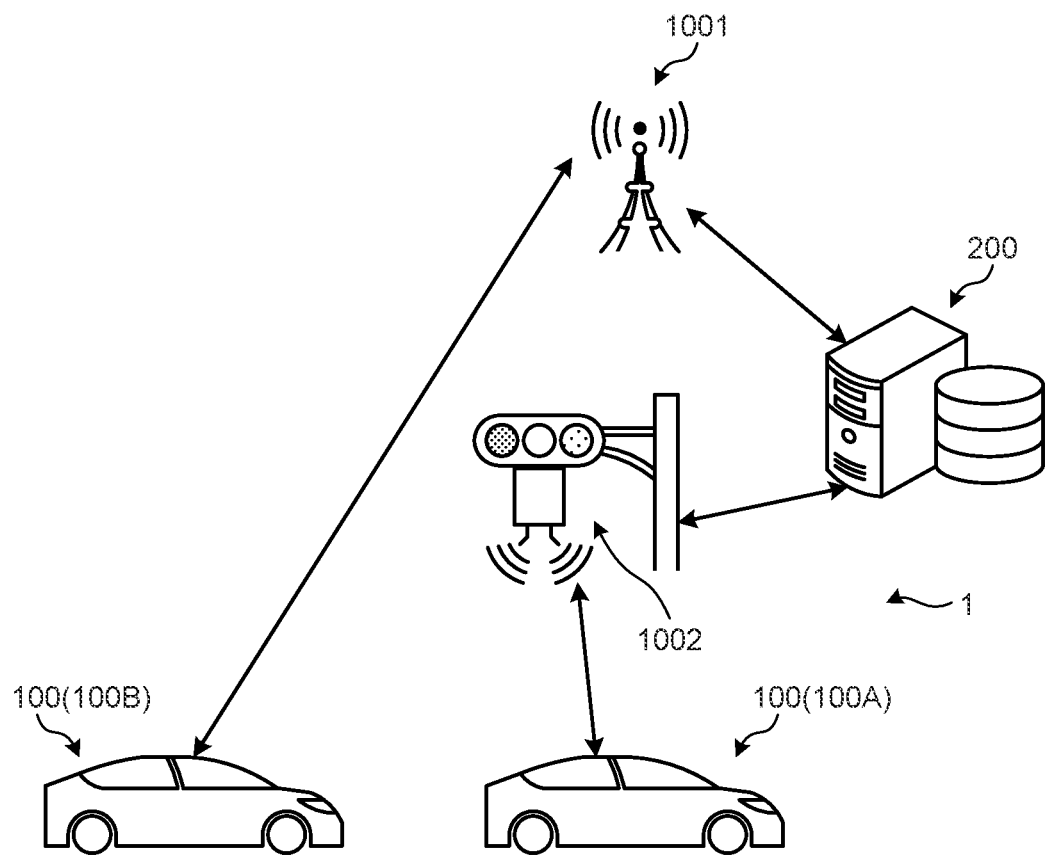
FIG. 1 is a diagram illustrating an example of implementing a traffic control system according to an embodiment.

FIG. 1 is a diagram illustrating an example of implementing a traffic control system according to an embodiment.

As illustrated in FIG. 1, a traffic control system 1 includes a plurality of vehicles 100 and a control apparatus 200. The vehicles 100 and the control apparatus 200 can communicate with each other via, for example, a base station 1001, a road side unit (RSU) 1002, and the like. The vehicles 100 include automobiles, electric vehicles, motorcycles, mobile robots, unmanned aerial vehicles (UAV), such as drones. In the example illustrated in FIG. 1, the traffic control system 1 includes two vehicles, a vehicle 100A and a vehicle 100B, but may include three or more vehicles 100. In the following description, the vehicle 100A and the vehicle 100B may be referred to as the vehicle 100 when not distinguished from each other.

The vehicle 100 transmits a vehicle to everything (V2X) message to other vehicles 100 or the RSU 1002. Other vehicles 100 receiving the V2X message or the RSU 1002 transfers information acquired via the V2X message to the control apparatus 200. In addition, the vehicle 100 transmits information related to a driving support apparatus mounted on the vehicle 100 to the control apparatus 200 via the base station 1001. The information related to the driving support apparatus may include, for example, information related to an arbitrary sensor connected to the driving support apparatus. Here, the V2X message may be a vehicle to vehicle (V2V) message, a vehicle to pedestrian (V2P) message, a vehicle to network (V2N) message, or a vehicle to infrastructure (V2I) message.

The control apparatus 200 is, for example, a so-called cloud server, and is a server device that executes information processing in cooperation with the vehicles 100. The control apparatus 200 has a function of controlling and managing operations of the plurality of vehicles 100. Furthermore, the function of controlling and managing the operations of the plurality of vehicles 100 may be realized by using an output result obtained by inputting, to artificial intelligence (AI), information related to the driving support apparatus collected via the above V2X message. Here, the AI may be one integrated function having a plurality of inputs and outputs, or may be a function divided into a plurality of functions having different inputs and outputs for each control target. Further, when the function of the AI is divided into a plurality of pieces, the functions may be distributed and implemented on a plurality of servers, or may be statically distributed, or may be dynamically distributed according to time and place in consideration of a calculation amount, a delay characteristic, and a mobile edge computing (MEC) characteristic.

Configuration Example of Control Apparatus According to Embodiment

Figure 2:
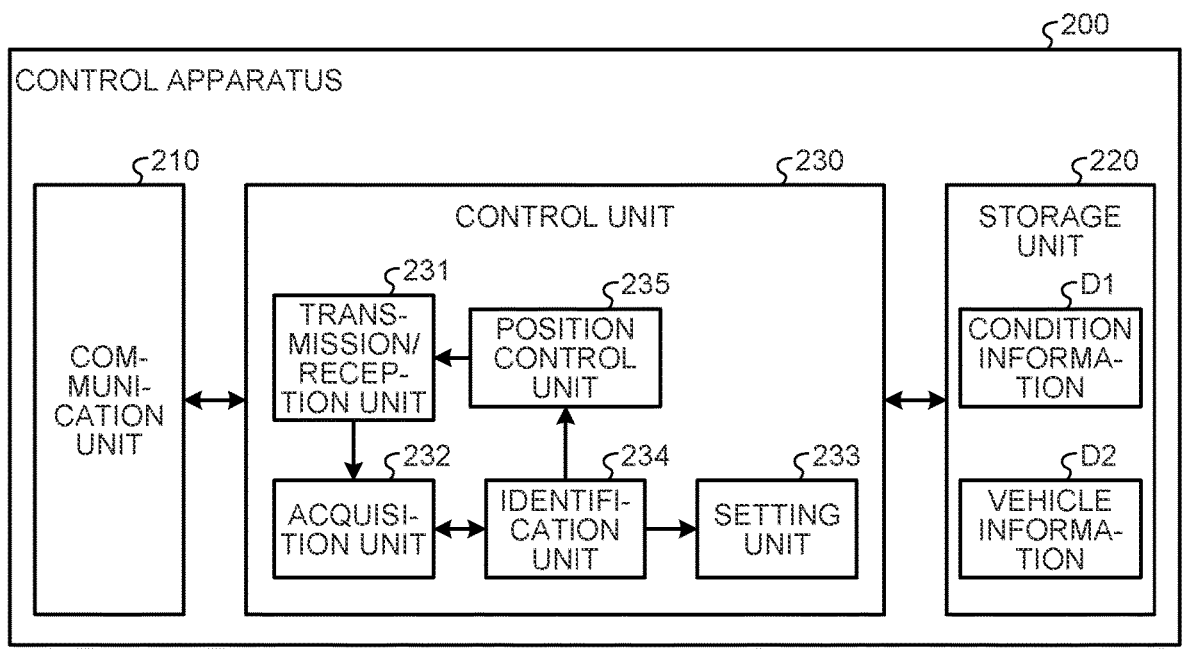
FIG. 2 is a diagram illustrating an example of a configuration of a control apparatus according to the embodiment.

FIG. 2 is a diagram illustrating an example of a configuration of the control apparatus 200 according to the embodiment. As illustrated in FIG. 2, the control apparatus 200 includes a communication unit 210, a storage unit 220, and a control unit 230. The control unit 230 is electrically connected to the communication unit 210 and the storage unit 220.

The communication unit 210 has a function of communicating with the vehicles 100, the base station 1001, the RSU 1002, and the like. A communication protocol supported by the communication unit 210 is not particularly limited, and the communication unit 210 can support a plurality of types of communication protocols. Furthermore, the communication unit 210 may support a plurality of types of wireless interfaces. For example, the communication unit 210 outputs information received from the vehicle 100 to the control unit 230, and transmits information from the control unit 230 to the vehicles 100.

The storage unit 220 is realized by, for example, a semiconductor memory element such as a random access memory (RAM) or a flash memory, or a storage device such as a hard disk or an optical disk. The storage unit 220 stores, for example, various types of information such as condition information D1 and vehicle information D2. The condition information D1 includes, for example, information indicating a condition for identifying the corresponding vehicle 100. The vehicle information D2 includes, for example, information that can identify the vehicle 100.

The control unit 230 is, for example, a dedicated or general-purpose computer. The control unit 230 controls the operation of the control apparatus 200. The control unit 230 includes a transmission/reception unit 231, an acquisition unit 232, a setting unit 233, an identification unit 234, and a position control unit 235. Each functional unit of the transmission/reception unit 231, the acquisition unit 232, the setting unit 233, the identification unit 234, and the position control unit 235 is realized by, for example, the control unit 230 executing a program stored in the control unit 230 using a RAM or the like as a work area.

Transmission/reception unit 231 receives information from the vehicle 100 via the communication unit 210. Transmission/reception unit 231 transmits information to the vehicle 100 via the communication unit 210.

The acquisition unit 232 acquires, via the transmission/reception unit 231, the vehicle information D2 that can identify the vehicle 100, a driving support system installed in the vehicle 100, and the like. The vehicle information D2 includes, for example, information related to the V2X message issued by the driving support system, information acquired by an arbitrary sensor connected to the driving support system, and information related to a position of the vehicle 100. Acquisition unit 232 stores the information acquired in the storage unit 220 as the vehicle information D2 for each vehicle 100. In other words, the control apparatus 200 holds the vehicle information D2 for the each vehicle 100. The vehicle information D2 includes, for example, information related to an insurance covering the vehicle 100. The information related to the insurance includes, for example, information related to whether or not the vehicle 100 is covered by an insurance for third-party damage, property damage, personal injury, or passenger injury, each insurance compensation amount, and the like.

Setting unit 233 sets a condition for identifying the vehicle 100. The condition to be set includes, for example, whether or not the vehicle 100 traveling ahead is covered by the insurance for third-party damage, property damage, personal injury, or passenger injury. The condition to be set may be, for example, whether or not the vehicle 100 is covered by the insurance with the predetermined compensation amount or higher with respect to third-party damage, property damage, personal injury, passenger injury, or the like. The condition to be set may be, for example, whether or not the vehicle 100 traveling ahead is equipped with the driving support system. The condition to be set may be, for example, whether or not the vehicle 100 is equipped with the driving support system at a certain technical level or higher. The certain technical level means, for example, a level of a device or the like used in the driving support system. The certain technical level may be, for example, one of levels of driving automation (0 to 5). The condition set may be, for example, a legal speed of a road where the own vehicle travels. In other words, the setting unit 233 may set at least one condition among the plurality of conditions. The setting unit 233 stores the condition information D1 indicating the set condition in the storage unit 220.

The identification unit 234 identifies the vehicle 100 satisfying the condition indicated by the condition information D1 in the storage unit 220 based on the vehicle information D2 acquired via the acquisition unit 232. The identification unit 234 identifies the vehicle 100 that satisfies the condition by determining whether the vehicle 100 satisfies the condition of the condition information D1 based on, for example, the identification information of the vehicle 100 indicated by the vehicle information D2 and the condition information D1 in the storage unit 220.

On the basis of the vehicle information D2 in the storage unit 220, the identification unit 234 identifies the vehicle 100 not covered by the insurance with the predetermined compensation amount or higher with respect to third-party damage, property damage, personal injury, passenger injury, or the like, or the vehicle 100 covered by the insurance. The identification unit 234 identifies the vehicle 100 not equipped with the driving support system at the certain technical level or higher or the vehicle 100 equipped with the driving support system at the certain technical level or higher. The identification unit 234 identifies whether or not the vehicle 100 is traveling at a speed equal to or faster than the legal speed of the road. The legal speed is, for example, a speed set for the vehicle 100, and the legal speed is, for example, 60 km/h for an automobile and 80 km/h for an emergency automobile in the case of a general road, and is 100 km/h for an automobile and 80 km/h for a large cargo and a trailer in the case of an expressway. In other words, the identification unit 234 can identify whether or not the vehicle 100 is traveling at the speed equal to or faster than the legal speed of the road on the basis of the type of the vehicle 100 and the type of the road on which the vehicle 100 is traveling.

The position control unit 235 controls relative positions of the plurality of vehicles 100. For example, the position control unit 235 sets an inter-vehicle distance according to a relative distance between the plurality of vehicles 100, and controls the relative position between the vehicles 100 so as to retain the set inter-vehicle distance. For example, the position control unit 235 controls the distance to the vehicle 100 traveling ahead with respect to the vehicle 100 identified by the identification unit 234. The relative position includes, for example, a relative position between front and rear vehicles 100, a relative position between vehicles 100 driving on different lanes, and the like. For example, the position control unit 235 obtains the relative distance between the vehicles 100 on the basis of the position information acquired from the vehicles 100. The position control unit 235 obtains the relative distance between the vehicles 100 on the basis of, for example, a distance and a direction to surrounding vehicles obtained from the vehicle 100. Furthermore, for example, when the position control unit 235 controls the operation of the vehicle 100, the position control unit 235 may obtain the position of each vehicle 100 from the operation plan to obtain the relative position from the position obtained.

In a case where the position control unit 235 identifies the characteristic that the vehicle 100 traveling ahead of the identified vehicle 100 is the vehicle 100 covered by the insurance with the predetermined compensation amount or higher, a first inter-vehicle distance is set with respect to the identified vehicle 100. The first inter-vehicle distance includes, for example, a distance of 22 m. In addition, in a case where the position control unit 235 identifies the characteristic that the vehicle 100 traveling ahead of the identified vehicle 100 is the vehicle 100 not covered by the insurance with the predetermined compensation amount or higher, a second inter-vehicle distance is set with respect to the identified vehicle 100. The second inter-vehicle distance includes, for example, a distance of 27 m.

When the identification unit 234 identifies that the vehicle 100 is equipped with the driving support system at the certain technical level or higher, the position control unit 235 sets the first inter-vehicle distance to the identified vehicle 100. Still more, when the identification unit 234 identifies that the vehicle 100 is not equipped with the driving support system at the certain technical level or higher, the position control unit 235 sets the second inter-vehicle distance to the identified vehicle 100.

When the identification unit 234 identifies that the vehicle 100 is not traveling on a road at the legal speed or faster, the position control unit 235 sets the first inter-vehicle distance to the identified vehicle 100. When the identification unit 234 identifies that the vehicle 100 is traveling on the road at the legal speed or faster, the position control unit 235 sets a third inter-vehicle distance to the identified vehicle 100. The third inter-vehicle distance includes, for example, a distance of 45 m.

The position control unit 235 controls the relative position between the vehicles 100 by controlling the inter-vehicle distance between the plurality of vehicles 100. For the control of the inter-vehicle distance, for example, as the vehicle 100 traveling ahead of the vehicle 100, one vehicle 100 immediately ahead may be controlled, or a plurality of vehicles 100 ahead may be controlled. In the case of controlling the plurality of vehicles 100, for example, control may be performed by giving a larger weight to the vehicles 100 closer to the vehicle 100. The position control unit 235 gives instruction for the inter-vehicle distance, a traveling position, and the like to a control target vehicle 100 via the transmission/reception unit 231.

For example, the position control unit 235 generates control information for controlling movement of the vehicle 100 according to the set relative position. The control information includes, for example, information for controlling at least one of the vehicle 100 and surrounding vehicles. The control information includes, for example, information such as a distance to the surrounding vehicles, a speed, and an operation plan. In the present embodiment, the position control unit 235 transmits an instruction including the control information to the vehicle 100 via the communication unit 210, thereby controlling movement of the vehicle 100 so that the relative positions between the vehicle 100 and the surrounding vehicles become the set relative positions.

Note that at least generation of the control information or transmission control may be implemented by the control unit 230. For example, the control unit 230 may generate the control information for controlling the movement of the vehicle 100 according to the relative position, and transmit an instruction including the control information to the vehicle 100. For example, a generation unit that generates the control information may be added to the control unit 230 as a new function.

The functional configuration example of the control apparatus 200 according to the embodiment has been described above. Note that the above configuration described with reference to FIG. 2 is merely an example, and the functional configuration of the control apparatus 200 according to the embodiment is not limited to the example. The functional configuration of the control apparatus 200 according to the embodiment can be flexibly modified according to specifications and operations.

Example of Vehicle Configuration According to Embodiment

Figure 3:
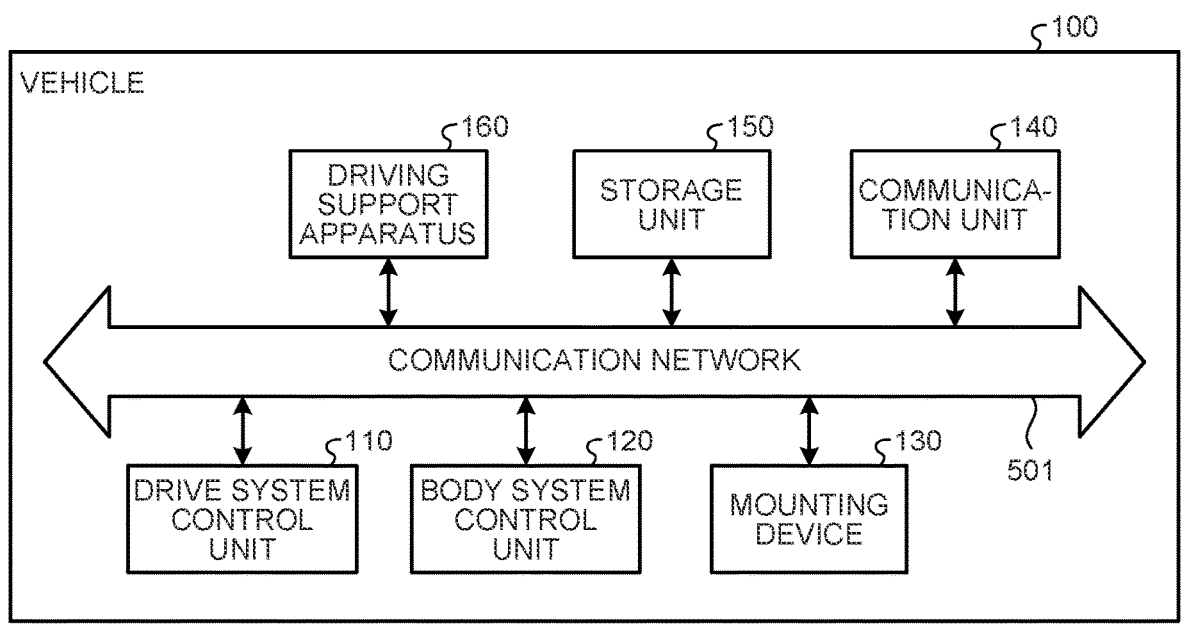
FIG. 3 is a configuration diagram illustrating an example of a configuration of a vehicle according to the embodiment.

Next, an example of a configuration of the vehicle 100 according to the embodiment will be described. FIG. 3 is a configuration diagram illustrating the example of the configuration of the vehicle 100 according to the embodiment.

As illustrated in FIG. 3, the vehicle 100 includes a plurality of electronic control units connected via a communication network 101. The communication network 101 includes, for example, an in-vehicle communication network or a bus conforming to an arbitrary standard such as a controller area network (CAN), a local interconnect network (LIN), a local area network (LAN), or FlexRay (registered trademark). Note that each unit of the vehicle 100 may be directly connected without the communication network 101.

In the example illustrated in FIG. 3, the vehicle 100 includes a drive system control unit 110, a body system control unit 120, a mounting device 130, a communication unit 140, a storage unit 150, and a driving support apparatus 160. In the present embodiment, a case where the mounting device 130 and the driving support apparatus 160 are connected via the communication network 501 will be described. However, for example, the mounting device 130 and the driving support apparatus 160 may be directly connected via, for example, an interface. Here, the configuration of direct connection may include a configuration of connection by device to device (D2D) communication. In the present embodiment, a case where the vehicle 100 includes one mounting device 130 will be described. However, the vehicle 100 may include a plurality of mounting devices 130.

The drive system control unit 110 controls the operation of devices related to the drive system of the vehicle 100 according to various programs. For example, the drive system control unit 110 functions as a controller of a driving force generation device for generating a driving force of the vehicle 100 such as an internal combustion engine or a driving motor, a driving force transmission mechanism for transmitting the driving force to wheels, a steering mechanism for adjusting a steering angle of the vehicle 100, a braking device for generating a braking force of the vehicle 100, and the like.

The body system control unit 120 controls operations of various devices mounted on a vehicle body according to various programs. For example, the body system control unit 120 functions as a controller of a keyless entry system, a smart key system, a power window device, or various lamps such as a head lamp, a back lamp, a brake lamp, a blinker, or a fog lamp. In this case, radio waves transmitted from a portable device that substitutes for a key or signals of various switches can be input to the body system control unit 120. The body system control unit 120 receives input of these radio waves or signals, and controls a door lock device, a power window device, and lamps. Furthermore, the body system control unit 120 may control static or dynamic information displayed on a display device installed in the body.

The mounting device 130 detects information outside the vehicle 100. The mounting device 130 includes, for example, various sensors, and an imaging device. The mounting device 130 detects an environment of a surrounding area of the mounting device 130 as external information. The surrounding area of the mounting device 130 refers to, for example, an area that can be detected by the mounting device 130. As the mounting device 130, for example, at least one of a camera, a distance sensor, a sound wave sensor, an acceleration sensor, a gyro sensor, a position sensor, light detection and ranging or laser imaging detection and ranging (LiDAR), a radar, a temperature sensor, a humidity sensor, or an atmospheric pressure sensor can be used. Further, the mounting device 130 may be mounted inside a tire to measure acceleration in the circumferential direction of the tire, an internal pressure, and a temperature. For example, the mounting device 130 detects a road surface condition (e.g., dry, semi-wet, wet, snow cover, pressed snow, frozen road surface, and sherbet-like road surface). In addition, the mounting device 130 may detect the position by using, for example, a global navigation satellite system (GNSS) represented by a global positioning system (GPS), map matching, Wi-Fi (registered trademark) positioning, magnetic positioning, Bluetooth (registered trademark) low energy (BLE) positioning, beacon positioning, and the like. Mounting device 130 supplies detected information to the driving support apparatus 160. Further, the driving support apparatus 160 may transmit the detected information to the control apparatus 200 via V2X communication.

The communication unit 140 communicates with various external electronic apparatuses, the control apparatus 200, the base station 1001, the RSU 1002, and the like. The communication unit 140 outputs data received from the control apparatus 200 or information included in the data to the driving support apparatus 160, and transmits data from the control apparatus 200 or information included in the data to the driving support apparatus 160. Note that the communication protocol supported by the communication unit 140 is not particularly limited, and the communication unit 140 can support a plurality of types of communication protocols. Furthermore, the communication unit 140 may support a plurality of types of wireless interfaces.

For example, the communication unit 140 performs wireless communication with the driving support apparatus 160 or the like mounted on other vehicles 100 by wireless LAN, Bluetooth (registered trademark), near field communication (NFC), wireless USB (WUSB), or the like.

For example, the communication unit 140 communicates with the control apparatus 200 existing on an external network (e.g., the Internet, a cloud network, or a company-specific network) via the base station 1001 or an access point. Furthermore, for example, the communication unit 140 performs the V2X communication such as vehicle to vehicle (V2V) communication, vehicle to infrastructure (V2I) communication, vehicle to network communication, vehicle to home communication, and vehicle to pedestrian (V2P) communication. In other words, by the V2X communication, the communication unit 140 can communicate with the communication unit 140, the RSU 1002, the base station 1001 or the access point mounted on other vehicles 100, a wireless communication terminal (e.g., a smartphone and a wearable device) carried by a pedestrian, a personal computer in a house, a tablet terminal, and the like. Furthermore, for example, the communication unit 140 includes a beacon receiver for receiving radio waves or electromagnetic waves transmitted from a wireless station or the like installed on a road to acquire information such as a current position, congestion, traffic restriction, or required time.

The storage unit 150 stores various types of data and programs. The storage unit 150 is, for example, a random access memory (RAM), a semiconductor memory element such as a flash memory, a hard disk, or an optical disk. The storage unit 150 stores information received via the communication unit 140. The storage unit 150 stores, for example, various types of information such as the vehicle information D2 associated with the vehicle 100.

The driving support apparatus 160 is, for example, a dedicated or general-purpose computer. The driving support apparatus 160 is an example of a driving support system. The driving support apparatus 160 is, for example, an integrated control unit that controls the vehicle 100. The driving support apparatus 160 can calculate a control target value for the driving force generation device, the steering mechanism, or the braking device on the basis of information inside and outside the vehicle detected by the mounting device 130, and output a control command to the drive system control unit 110. For example, the driving support apparatus 160 can perform cooperative control for the purpose of implementing functions of the ADAS including collision avoidance or impact mitigation of the vehicle 100, following travel based on an inter-vehicle distance, speed-maintained travel, vehicle collision warning, vehicle lane departure warning, and the like.

The driving support apparatus 160 controls the driving force generator, the steering mechanism, the braking device, and the like on the basis of the information of the surrounding area of the vehicle 100 (outside world) detected by the mounting device 130. As a result, the driving support apparatus 160 can perform cooperative control for the purpose of assisting the operation of the driver, automated driving for autonomous travel without depending on driver's operation, or the like.

The driving support apparatus 160 can output a control command to the body system control unit 120 on the basis of information outside the vehicle detected by the mounting device 130. For example, the driving support apparatus 160 can perform cooperative control for the purpose of preventing glare, such as switching from a high beam to a low beam, by controlling the headlamp according to the position of a preceding vehicle or an oncoming vehicle detected by the mounting device 130. In addition, the driving support apparatus 160 can perform control to turn on or blink the brake lamp before the driver starts the braking operation when the possibility of collision with the vehicle traveling ahead is detected. Further, when a lane change of the vehicle or the start of a right or left turn is detected in a state where the blinker is not operated, the driving support apparatus 160 can perform control to execute blinking of the blinker suitable for the lane change or the right or left turn.

The configuration example of the vehicle 100 according to the embodiment has been described above. Note that the above-described configuration described with reference to FIG. 3 is merely an example, and the functional configuration of the vehicle 100 according to the embodiment is not limited to the example. The configuration of the vehicle 100 according to the embodiment can be flexibly modified according to specifications and operations.

Process Procedure of Control Apparatus According to Embodiment

Next, the process procedure of the control apparatus 200 according to the embodiment will be described with reference to FIG. 4. FIG. 4 is a flowchart illustrating an example of the process procedure of the control apparatus 200 according to the embodiment. FIG. 5 is a table illustrating an example of the condition information D1 according to the embodiment.

The process procedure illustrated in FIG. 4 is realized by causing the control unit 230 of the control apparatus 200 to execute a program. The process procedure illustrated in FIG. 4 is repeatedly executed by the control unit 230 at a fixed or variable cycle. Furthermore, the process procedure illustrated in FIG. 4 may be activated by the control unit 230 in response to, for example, occurrence of an event, detection of a trigger, or the like. For example, the process procedure illustrated in FIG. 4 is executed by the control unit 230 in a case where the legal speed of the traveling road has changed, the lane width of the traveling lane has narrowed, the number of traveling lanes has been reduced, a change in the road surface condition has been detected, or the like. Alternatively, the process procedure illustrated in FIG. 4 may be executed by the control unit 230 at a timing of entering a preset area or exiting from the preset area. The preset area is, for example, a spot or an area having a history that accidents frequently occur.

As illustrated in FIG. 4, the control unit 230 of the control apparatus 200 acquires the vehicle information D2 of the vehicle 100 traveling ahead and the control target vehicle 100 (Step S101). The vehicle 100 traveling ahead means the vehicle 100 traveling in front of the control target vehicle 100. For example, the control unit 230 acquires the vehicle information D2 including the identification information of the vehicle 100 such as a number uniquely assigned to identify the vehicle body. The identification information includes, for example, a chassis number, an automobile registration number mark, a vehicle number label, and the like.

The control unit 230 checks the set condition (Step S102). The control unit 230 determines whether or not the vehicle information D2 acquired satisfies the set condition (Step S103). For example, the control unit 230 compares the vehicle information D2 with the condition indicated by the condition information D1, and determines whether or not the condition is satisfied on the basis of the comparison result.

For example, as illustrated in FIG. 5, a plurality of conditions is set in the condition information D1. A condition C1 set is, for example, "the vehicle 100 traveling ahead is not covered by the insurance with the predetermined compensation amount or higher with respect to third-party damage, property damage, personal injury, passenger injury, or the like". A condition C2 set is, for example, "the vehicle 100 traveling ahead is not equipped with the driving support apparatus 160 at the certain technical level or higher". Further, a condition C3 set is, for example, "the legal speed of the road on which the vehicle is traveling is 60 km/h or higher". In the condition information D1, one condition may be set, or a plurality of conditions may be set. In this case, the control unit 230 determines that the condition is satisfied when the vehicle 100 indicated by the vehicle information D2 satisfies any of condition C1, condition C2, and condition C3.

Returning to FIG. 4, when the control unit 230 determines that the condition set is satisfied (Yes in Step S103), the process goes to Step S104. The control unit 230 sets the first inter-vehicle distance as the inter-vehicle distance (Step S104). When the process in Step S104 is completed, the control unit 230 advances the process to Step S105. The control unit 230 instructs the vehicle 100 to achieve the set inter-vehicle distance via the communication unit 210 (Step S105). For example, in a case where the first inter-vehicle distance is set as the inter-vehicle distance, the control unit 230 gives instruction for the first inter-vehicle distance to the identified vehicle 100 so that the relative position of the vehicles 100 changes to travel at the first inter-vehicle distance. When the process in Step S105 is completed, the control unit 230 ends the process procedure illustrated in FIG. 4.

When the control unit 230 determines that the condition set is not satisfied (No in Step S103), the process goes to the Step S106. The control unit 230 sets the second inter-vehicle distance as the inter-vehicle distance (Step S106). The control unit 230 instructs the vehicle 100 to achieve the set inter-vehicle distance via the communication unit 210 (Step S105). For example, in a case where the second inter-vehicle distance is set as the inter-vehicle distance, the control unit 230 gives an instruction for achieving the second inter-vehicle distance to the identified vehicle 100 so that the relative position of the vehicles 100 changes to travel at the second inter-vehicle distance. When the process in Step S105 is completed, the control unit 230 ends the process procedure illustrated in FIG. 4.

Operation Example of Traffic Control System According to Embodiment

Figure 8:
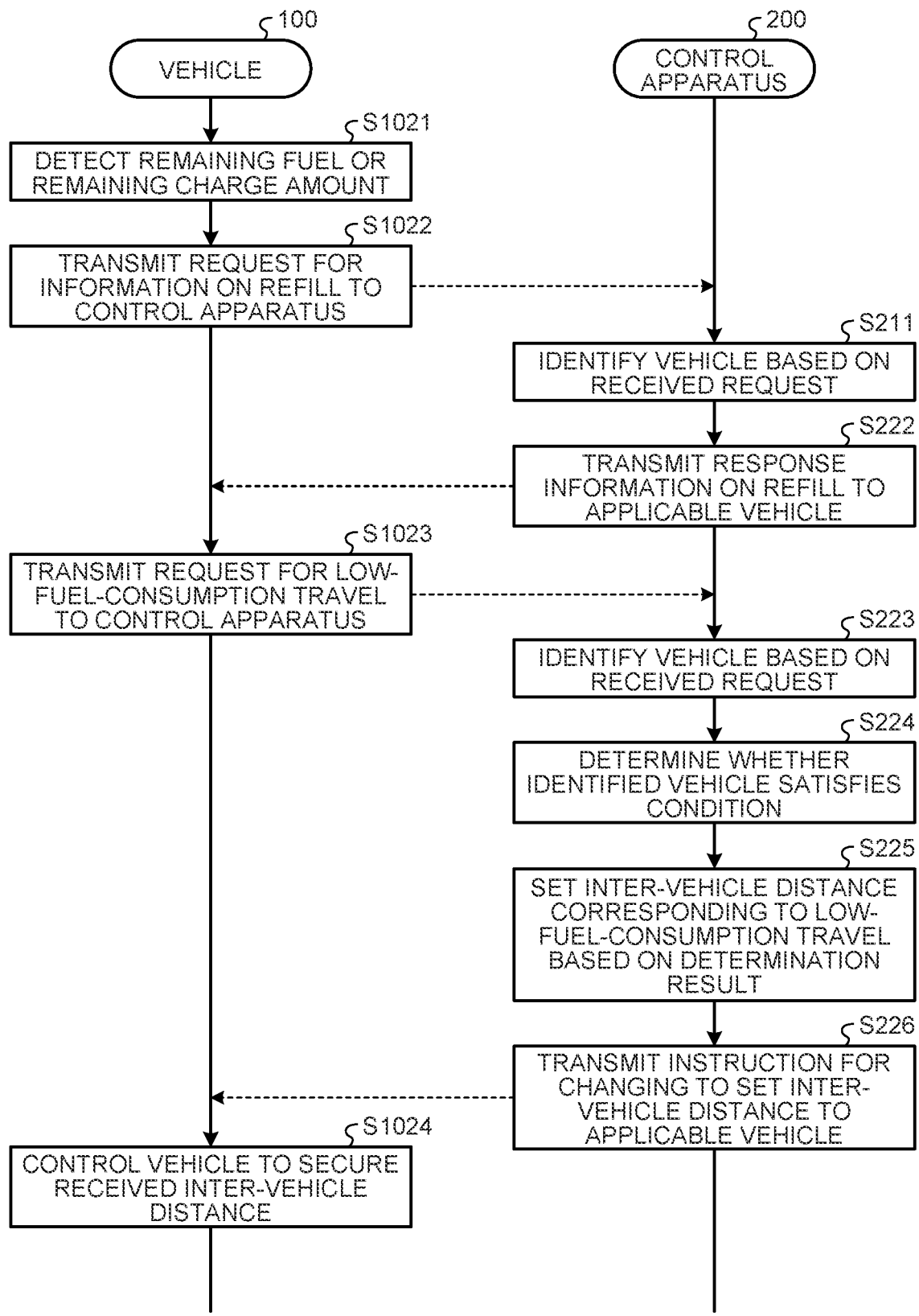
FIG. 8 is a sequence diagram illustrating another example of the operation of the traffic control system according to the embodiment.

Next, the operation of the traffic control system 1 according to the embodiment will be described with reference to FIG. 6 to FIG. 8. FIG. 6 is a sequence diagram illustrating an example of the operation of the traffic control system 1 according to the embodiment. FIG. 7 and FIG. 8 are sequence diagrams illustrating another examples of the operation of the traffic control system 1 according to the embodiment.

As illustrated in FIG. 6, the vehicle 100 transmits the vehicle information D2 to the control apparatus 200 via the communication unit 140 (Step S1001). For example, the vehicle 100 transmits the vehicle information D2 including the identification information of the own vehicle and the like to the control apparatus 200. In addition, the vehicle 100 may transmit, to the control apparatus 200, the automobile registration number mark of the preceding vehicle or information for identifying the preceding vehicle acquired via the V2X message. Note that the vehicle 100 may also transmit information related to a position of the preceding vehicle transmitted via the V2X message.

When the control apparatus 200 receives the vehicle information D2 from the vehicle 100, the control apparatus 200 identifies the vehicle 100 based on the vehicle information D2 received (Step S201). The control apparatus 200 determines whether the identified vehicle 100 satisfies the condition (Step S202). The control apparatus 200 sets the inter-vehicle distance on the basis of a determination result (Step S203). The control apparatus 200 transmits an instruction for changing to the set inter-vehicle distance to applicable vehicle 100 via the communication unit 210 (Step S204). The instruction is, for example, information including the control information such as the inter-vehicle distance, the speed, and the operation plan.

When the vehicle 100 receives the instruction from the control apparatus 200, the vehicle 100 is controlled to secure the inter-vehicle distance received (Step S1002). The vehicle 100 operates the drive system control unit 110 so as to achieve the inter-vehicle distance instructed by the control apparatus 200. As a result, the vehicle 100 can change the relative position by changing the inter-vehicle distance between the own vehicle and the vehicle 100 traveling ahead.

Next, another example of the operation of the traffic control system 1 will be described. As illustrated in FIG. 7, the vehicle 100 detects air resistance based on a detection result of the mounting device 130 (Step S1011). For example, the vehicle 100 detects the air resistance based on traveling resistance or the like received during traveling. The vehicle 100 transmits the vehicle information D2 including the air resistance to the control apparatus 200 via the communication unit 140 (Step S1012). For example, the vehicle 100 transmits the vehicle information D2 including the identification information of the own vehicle and the like to the control apparatus 200.

When the control apparatus 200 receives the vehicle information D2 from the vehicle 100, the control apparatus 200 identifies the vehicle 100 based on the vehicle information D2 received (Step S211). The control apparatus 200 determines whether the air resistance of the identified vehicle 100 satisfies the condition (Step S212). The condition related to the air resistance set in the condition information D1 may be variable according to, for example, the type, model, and the like of the vehicle 100. As the condition, for example, a different air resistance condition is set depending on a difference between light vehicles, sedans, light trucks, and heavy trucks. The control apparatus 200 sets the inter-vehicle distance on the basis of the determination result (Step S213). The control apparatus 200 transmits an instruction for changing to the set inter-vehicle distance to the applicable vehicle 100 via the communication unit 210 (Step S214).

When the vehicle 100 receives the instruction from the control apparatus 200, the vehicle 100 is controlled to secure the inter-vehicle distance received (Step S1013). The vehicle 100 operates the drive system control unit 110 so as to achieve the inter-vehicle distance instructed by the control apparatus 200. As a result, the vehicle 100 can change the relative position by changing the inter-vehicle distance between the own vehicle and the vehicle 100 traveling ahead according to the inter-vehicle distance corresponding to the air resistance.

The present embodiment describes the case where the control apparatus 200 sets the inter-vehicle distance (relative position) according to the value indicating the environment of the vehicle 100 by including the condition related to the air resistance of the vehicle 100 as the predetermined condition. However, the present embodiment is not limited thereto. For example, the control apparatus 200 may be configured to detect a value of a wind speed, a wind direction, a humidity, an atmospheric pressure, or the like by the vehicle 100, and set the inter-vehicle distance according to the environment of the vehicle 100 on the basis of the detected value.

Next, another example of the operation of the traffic control system 1 will be described. As illustrated in FIG. 8, the vehicle 100 detects remaining fuel or a remaining charge amount (Step S1021). For example, the vehicle 100 detects the amount of remaining fuel in the case of a vehicle equipped with an engine, and detects the remaining charge amount in the case of an electric vehicle. The vehicle 100 transmits a request for information related to refill to the control apparatus 200 via the communication unit 140 (Step S1022). The request for the information related to the refill includes, for example, the identification information of the own vehicle and information related to refueling or charging station.

When the control apparatus 200 receives the request from the vehicle 100, the control apparatus 200 identifies the vehicle 100 based on the request received (Step S221). The control apparatus 200 transmits response information related to refill to the applicable vehicle 100 via the communication unit 210 (Step S222). For example, the control apparatus 200 identifies information on a point where refueling can be performed or a point where charging can be performed based on a travel route of the identified vehicle 100, and transmits the response information including this information to the vehicle 100.

For example, when the vehicle 100 receives the response information from the control apparatus 200, the vehicle 100 determines the necessity of a low-fuel-consumption travel based on a distance to the point where refueling can be performed or the point where charging can be performed, and the amount of remaining fuel or the remaining charge amount. When the vehicle 100 determines that the low-fuel-consumption travel is necessary, the vehicle 100 transmits a request for the low-fuel-consumption travel to the control apparatus 200 via the communication unit 140 (Step S1023). The request for the low-fuel-consumption traveling includes, for example, the identification information of the own vehicle and information indicating the request for the low-fuel-consumption travel.

When the control apparatus 200 receives the request from the vehicle 100, the control apparatus 200 identifies the vehicle 100 based on the request received (Step S223). The control apparatus 200 determines whether the identified vehicle 100 satisfies the condition (Step S224). For example, the control apparatus 200 determines whether or not the vehicle 100 satisfies a condition for enabling the low-fuel-consumption travel. The control apparatus 200 sets the inter-vehicle distance corresponding to the low-fuel-consumption travel on the basis of the determination result (Step S225). Note that, in a case where the vehicle 100 does not satisfy the condition for enabling the low-fuel-consumption travel, the control apparatus 200 sets the inter-vehicle distance corresponding to a normal travel. The control apparatus 200 transmits an instruction for changing to the set inter-vehicle distance to the applicable vehicle 100 via the communication unit 210 (Step S226).

When the vehicle 100 receives the instruction from the control apparatus 200, the vehicle 100 is controlled to secure the inter-vehicle distance received (Step S1024). The vehicle 100 operates the drive system control unit 110 so as to achieve the inter-vehicle distance instructed by the control apparatus 200. As a result, the vehicle 100 can change the relative position by changing the inter-vehicle distance between the own vehicle and the vehicle 100 traveling ahead to an inter-vehicle distance corresponding to the low-fuel-consumption travel.

When the control apparatus 200 receives the request for the information related to the refill from the vehicle 100 in Step S1022, the control apparatus 200 may perform the process from Step S224 to Step S226 without transmitting the response information related to the refill to the vehicle 100 in Step S222, and transmit the instruction for changing to the set inter-vehicle distance to the applicable vehicle 100 via the communication unit 210. In this case, the control apparatus 200 may include the response information related to the refill in the instruction transmitted to change the inter-vehicle distance to the set inter-vehicle distance.

Modification (1) of Embodiment

Figure 9:
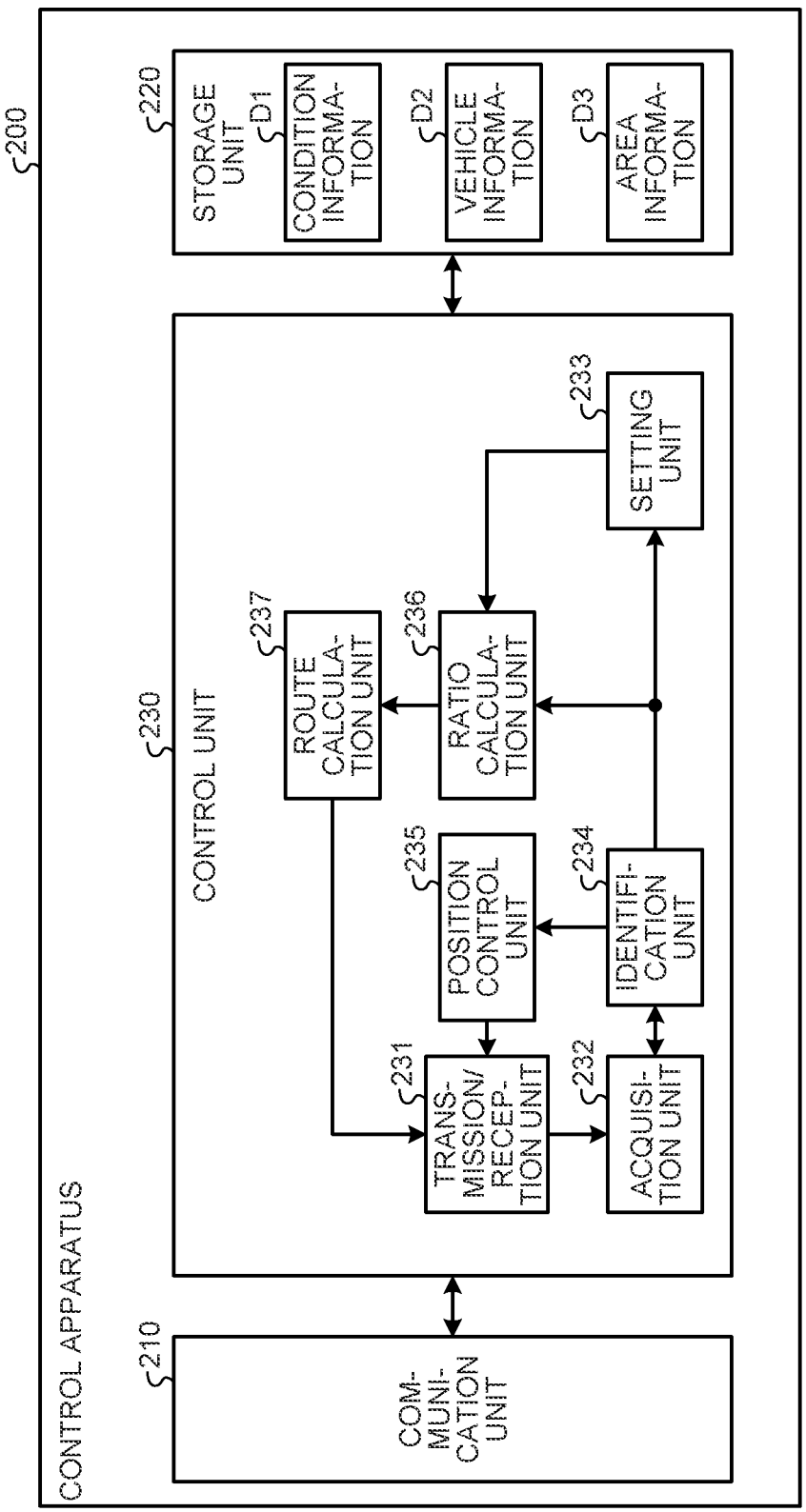
FIG. 9 is a diagram illustrating an example of a configuration of a control apparatus according to Modification (1) of the embodiment.

Next, Modification (1) of the embodiment will be described. FIG. 9 is a diagram illustrating an example of a configuration of the control apparatus 200 according to Modification (1) of the embodiment. As illustrated in FIG. 9, the control apparatus 200 includes the communication unit 210, the storage unit 220, and the control unit 230. The control unit 230 includes the transmission/reception unit 231, the acquisition unit 232, the setting unit 233, the identification unit 234, the position control unit 235, a ratio calculation unit 236, and a route calculation unit 237. Each functional unit of the transmission/reception unit 231, the acquisition unit 232, the setting unit 233, the identification unit 234, the position control unit 235, the ratio calculation unit 236, and the route calculation unit 237 is realized, for example, by the control unit 230 executing the program stored in the control unit 230 using the RAM or the like as the work area. In other words, the ratio calculation unit 236 and the route calculation unit 237 is added to the control unit 230 in the configuration of the embodiment.

The setting unit 233 further arbitrarily sets one or a plurality of areas. For example, the setting unit 233 sets a specific area for controlling vehicle 100. The setting unit 233 stores area information D3 indicating the set area in the storage unit 220. Note that the area may be set in advance.

The ratio calculation unit 236 calculates a ratio of vehicles 100 falling under the condition in each area set by the setting unit 233. For example, the ratio calculation unit 236 calculates the ratio on the basis of information such as a level of support and performance of the driving support apparatus 160, and information such as on a vehicle type, purchase of an insurance, and insurance coverage of each vehicle 100 identified by the identification unit 234, conditions set by the setting unit 233, and the area. For example, the ratio calculation unit 236 calculates the ratio of the vehicles 100 not covered by the insurance for third-party damage, property damage, personal injury, passenger injury, or the like to all the vehicles 100 traveling in the set area. For example, the ratio calculation unit 236 calculates the ratio of the vehicles 100 not equipped with the driving support apparatus 160 at the certain technical level or higher to all the vehicles 100 traveling in the set area. Since it is considered that the ratio of vehicles corresponding to an arbitrary condition changes according to time, the calculated ratio may be a value for each hour.

The route calculation unit 237 calculates a route to a destination of the vehicle 100 based on a ratio of vehicles 100 falling under the condition for each area calculated by the ratio calculation unit 236. For example, the route calculation unit 237 calculates a route in an area having a high ratio of the vehicles 100 covered by the insurance with the predetermined compensation amount or higher with respect to third-party damage, property damage, personal injury, passenger injury, or the like, as compared with a route in an area having a high ratio of the vehicles 100 that are not covered by the insurance with the predetermined compensation amount or higher with respect to third-party damage, property damage, personal injury, passenger injury, or the like. In addition, the route calculation unit 237 calculates, for example, a route that preferentially selects a route in an area having a high ratio of the vehicles 100 equipped with the driving support apparatus 160 at the certain technical level or higher than a route in an area having a high ratio of the vehicles 100 not equipped with the driving support apparatus 160 at the certain technical level or higher.

In a case of controlling the relative position of the vehicle 100, the control apparatus 200 can improve the safety of the traffic control by setting a dedicated inter-vehicle distance to the vehicles 100 not covered by the insurance with the predetermined compensation amount or higher. In addition, when the control apparatus 200 controls the relative position of the vehicle 100, the control apparatus 200 can improve the stability of the traffic control by maintaining an appropriate inter-vehicle distance to the vehicles 100 having different driving skills.

Modification (2) of Embodiment

Figure 10:
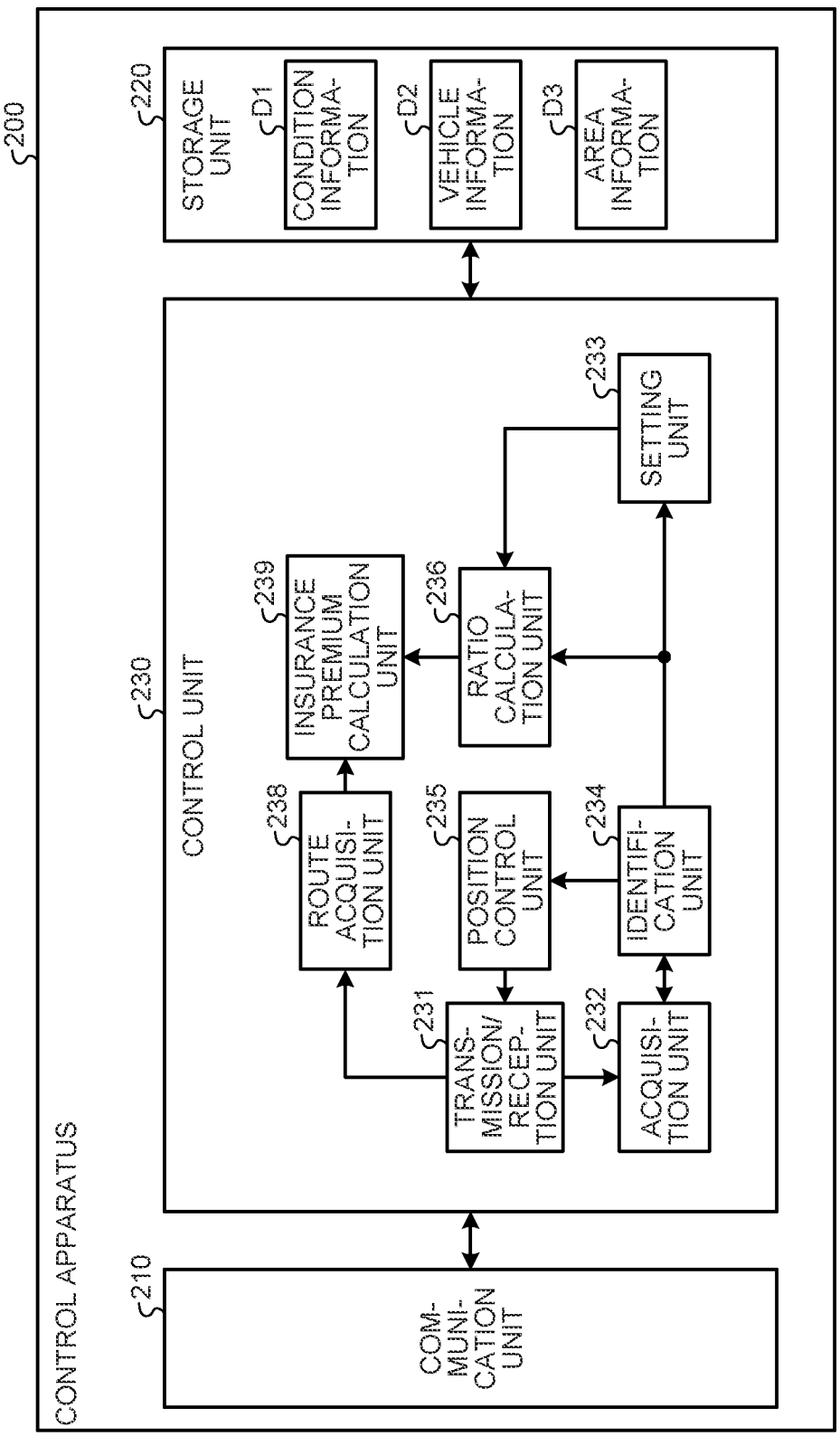
FIG. 10 is a diagram illustrating an example of a configuration of a control apparatus according to Modification (2) of the embodiment.

Next, Modification (2) of the embodiment will be described. FIG. 10 is a diagram illustrating an example of a configuration of the control apparatus 200 according to Modification (2) of the embodiment. As illustrated in FIG. 10, the control apparatus 200 includes the communication unit 210, the storage unit 220, and the control unit 230. The control unit 230 includes the transmission/reception unit 231, the acquisition unit 232, the setting unit 233, the identification unit 234, the position control unit 235, the ratio calculation unit 236, a route acquisition unit 238, and an insurance premium calculation unit 239. Each functional unit of the transmission/reception unit 231, the acquisition unit 232, the setting unit 233, the identification unit 234, the position control unit 235, the ratio calculation unit 236, the route acquisition unit 238, and the insurance premium calculation unit 239 is realized, for example, by the control unit 230 executing the program stored inside the control unit 230 using the RAM or the like as the work area. In other words, the ratio calculation unit 236, the route acquisition unit 238, and the insurance premium calculation unit 239 are added to the control unit 230 in the configuration of the embodiment.

The route acquisition unit 238 acquires, from the vehicle 100 via a transmission/reception unit 141, information on a route on which the vehicle has traveled in a fixed or variable cycle. The route acquisition unit 238 stores the acquired information in the storage unit 220.

The insurance premium calculation unit 239 calculates an insurance premium according to the ratio calculated by the ratio calculation unit 236 and the route acquired by the route acquisition unit 238. For example, the insurance premium calculation unit 239 calculates (adds) a high insurance premium in a case where the route on which the vehicle 100 has traveled is a route in an area having a ratio of the vehicles 100 not covered by the insurance with the predetermined compensation amount or higher with respect to third-party damage, property damage, personal injury, passenger injury, or the like. For example, the insurance premium calculation unit 239 calculates (adds) a low insurance premium in a case where the route on which the vehicle 100 has traveled is a route in an area having a high ratio of the vehicles 100 covered by the insurance with the predetermined compensation amount or higher with respect to third-party damage, property damage, personal injury, passenger injury, or the like.

For example, the insurance premium calculation unit 239 calculates (adds) a high insurance premium in a case where the route on which the vehicle 100 has traveled is a route in an area having a high ratio of the vehicles 100 not equipped with the driving support apparatus 160 at the certain technical level or higher. For example, the insurance premium calculation unit 239 calculates (adds) a low insurance premium in a case where the route on which the vehicle 100 has traveled is a route in an area having a high ratio of the vehicle 100 equipped with the driving support apparatus 160 at the certain technical level or higher. The insurance premium calculation unit 239 stores the calculated insurance premium in the storage unit 220 in association with the vehicle 100, and provides the calculated insurance premium to a server device or the like that manages the vehicle 100.

The control apparatus 200 can set the insurance premium according to a risk in each area having different driving skill distribution of the vehicles 100. Furthermore, by controlling the relative position of the vehicles 100, the control apparatus 200 can relatively reduce risks and reduce the insurance premium.

Modification (3) of Embodiment

Figure 11:
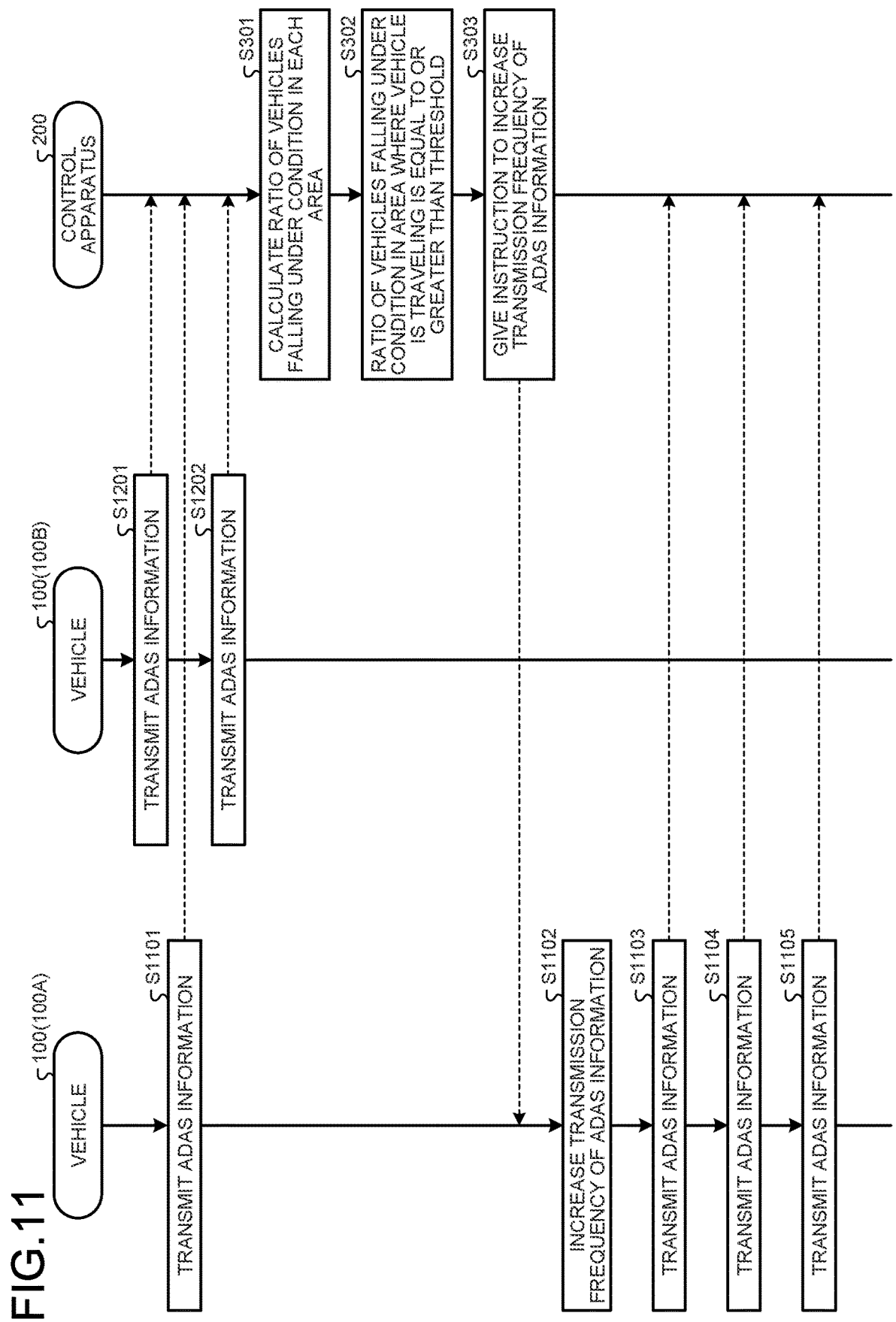
FIG. 11 is a sequence diagram illustrating another example of the operation of the traffic control system according to Modification (3) of the embodiment.

Next, Modification (3) of the embodiment will be described. FIG. 11 is a sequence diagram illustrating another example of the operation of the traffic control system 1 according to Modification (3) of the embodiment.

As illustrated in FIG. 11, a vehicle 100B transmits ADAS information to the control apparatus 200 via the communication unit 140 (Step S1201). The ADAS information includes, for example, information related to ADAS and information for identifying the vehicle 100. The vehicle 100B transmits the ADAS information at a preset cycle or a cycle instructed from the control apparatus 200.

A vehicle 100A transmits the ADAS information to the control apparatus 200 via the communication unit 140 (Step S1101). The vehicle 100A transmits the ADAS information to the control apparatus 200 at the preset cycle or the cycle instructed from the control apparatus 200.

Thereafter, the vehicle 100B transmits the ADAS information to the control apparatus 200 via the communication unit 140 (Step S1202).

When the control apparatus 200 receives the ADAS information from the vehicle 100A and the vehicle 100B via the communication unit 210, the control apparatus 200 stores the ADAS information received in the storage unit 220 in time series. The control apparatus 200 calculates the ratio of the vehicles 100 falling under the condition for each area (Step S301). For example, the control apparatus 200 calculates the ratio of vehicles 100 not equipped with the driving support apparatus 160 at the certain technical level or higher. For example, the control apparatus 200 determines that the ratio of the vehicles 100 not equipped with the driving support apparatus 160 at the certain technical level or higher in the area where the vehicle 100 is traveling is equal to or greater than a threshold (e.g., 0.5) (Step S302). The control apparatus 200 gives an instruction to increase a transmission frequency of the ADAS information via the communication unit 210 (Step S303). In the example illustrated in FIG. 11, the control apparatus 200 determines that the ratio of the vehicles 100 not equipped with the driving support apparatus 160 at the certain technical level or higher in the area where the vehicle 100A is traveling is equal to or greater than the threshold. Therefore, the control apparatus 200 instructs the vehicle 100A to increase the transmission frequency of the ADAS information. Note that this threshold may be dynamically changed according to a time zone or weather.

When the vehicle 100A receives the instruction to increase the transmission frequency of the ADAS information from the control apparatus 200 via the communication unit 140, the vehicle 100A increases the transmission frequency of the ADAS information (Step S1102). For example, the vehicle 100A changes the cycle or increases the number of transmissions so as to increase the transmission frequency of the ADAS information. The vehicle 100A transmits the ADAS information via the communication unit 140 at the changed transmission frequency (Step S1103, Step S1104, and Step S1105).

When the control apparatus 200 receives the ADAS information from the vehicle 100A via the communication unit 210, the control apparatus 200 stores the received ADAS information in the storage unit 220 in time series. The control apparatus 200 can perform appropriate traffic control leading to reduction of risks by acquiring the ADAS information from the vehicle 100 at a high frequency in an area where many vehicles 100 with low driving skills are distributed.

Modification (4) of Embodiment

Figure 12:
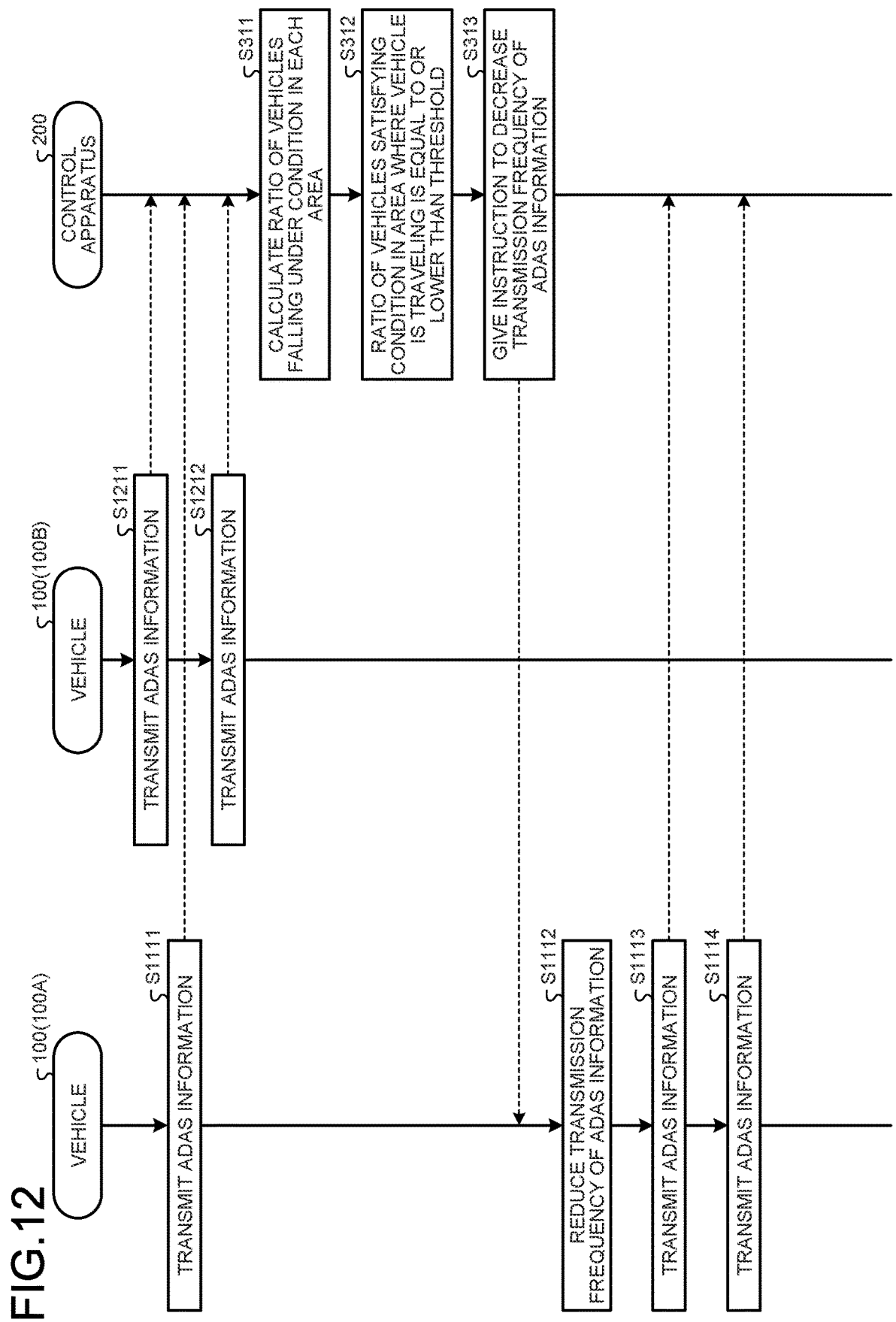
FIG. 12 is a sequence diagram illustrating another example of the operation of the traffic control system according to Modification (4) of the embodiment.

Next, Modification (4) of the embodiment will be described. FIG. 12 is a sequence diagram illustrating another example of the operation of the traffic control system 1 according to Modification (4) of the embodiment.

As illustrated in FIG. 12, the vehicle 100B transmits the ADAS information to the control apparatus 200 via the communication unit 140 (Step S1211). The vehicle 100B transmits the ADAS information at a preset cycle or a cycle instructed from the control apparatus 200.

The vehicle 100A transmits the ADAS information to the control apparatus 200 via the communication unit 140 (Step S1111). The vehicle 100A transmits the ADAS information to the control apparatus 200 at the preset cycle or the cycle instructed from the control apparatus 200.

Thereafter, the vehicle 100B transmits the ADAS information to the control apparatus 200 via the communication unit 140 (Step S1212).

When the control apparatus 200 receives the ADAS information from the vehicle 100A and the vehicle 100B via the communication unit 210, the control apparatus 200 stores the ADAS information received in the storage unit 220 in time series. The control apparatus 200 calculates the ratio of the vehicles 100 falling under the condition for each area (Step S311). For example, the control apparatus 200 calculates the ratio of vehicles 100 not equipped with the driving support apparatus 160 at the certain technical level or higher. For example, the control apparatus 200 determines that the ratio of the vehicles 100 not equipped with the driving support apparatus 160 at the certain technical level or higher in the area where the vehicle 100 is traveling is equal to or lower than the threshold (e.g., 0.3) (Step S312). The control apparatus 200 gives an instruction to decrease the transmission frequency of the ADAS information via the communication unit 210 (Step S313). In the example illustrated in FIG. 12, the control apparatus 200 determines that the ratio of the vehicles 100 not equipped with the driving support apparatus 160 at the certain technical level or higher in the area where the vehicle 100A is traveling is equal to or lower than the threshold. Therefore, the control apparatus 200 instructs the vehicle 100A to decrease the transmission frequency of the ADAS information. Note that this threshold may be dynamically changed according to a time zone or weather.

When the vehicle 100A receives an instruction to decrease the transmission frequency of the ADAS information from the control apparatus 200 via the communication unit 140, the vehicle 100A reduces the transmission frequency of the ADAS information (Step S1112). For example, the vehicle 100A changes the cycle or reduces the number of times of transmission so as to decrease the transmission frequency of the ADAS information. The vehicle 100A transmits the ADAS information via the communication unit 140 at the changed transmission frequency (Step S1113 and Step S1114).

When the control apparatus 200 receives the ADAS information from the vehicle 100A via the communication unit 210, the control apparatus 200 stores the received ADAS information in the storage unit 220 in time series. The control apparatus 200 acquires the ADAS information from the vehicle 100 at a low frequency in an area where a many vehicles 100 having high driving skills are distributed, so that it is possible to suppress a processing load on the vehicle 100 side and also perform appropriate traffic control leading to reduced risks.

Modification (5) of Embodiment

Figure 13:
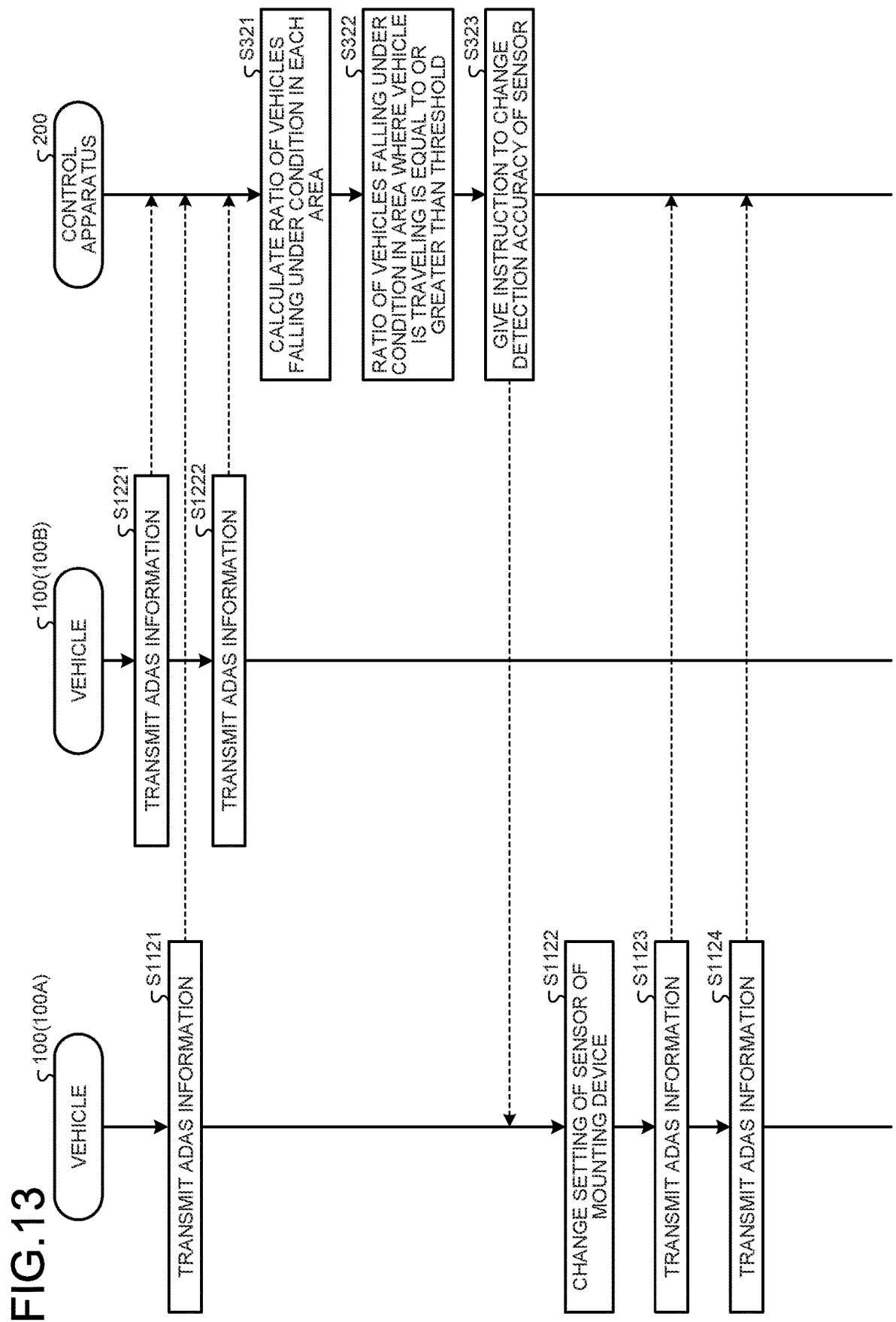
FIG. 13 is a sequence diagram illustrating another example of the operation of the traffic control system according to Modification (5) of the embodiment.

Next, Modification (5) of the embodiment will be described. FIG. 13 is a sequence diagram illustrating another example of the operation of the traffic control system 1 according to Modification (5) of the embodiment.

As illustrated in FIG. 13, the vehicle 100B transmits the ADAS information to the control apparatus 200 via the communication unit 140 (Step S1221). The vehicle 100B transmits the ADAS information at a preset cycle or a cycle instructed from the control apparatus 200.

The vehicle 100A transmits the ADAS information to the control apparatus 200 via the communication unit 140 (Step S1121). The vehicle 100A transmits the ADAS information to the control apparatus 200 at the preset cycle or the cycle instructed from the control apparatus 200.

Thereafter, the vehicle 100B transmits the ADAS information to the control apparatus 200 via the communication unit 140 (Step S1222).

When the control apparatus 200 receives the ADAS information from the vehicle 100A and the vehicle 100B via the communication unit 210, the control apparatus 200 stores the ADAS information received in the storage unit 220 in time series. The control apparatus 200 calculates a ratio of the vehicles 100 falling under the condition for each area (Step S321). For example, the control apparatus 200 calculates the ratio of vehicles 100 not equipped with the driving support apparatus 160 at the certain technical level or higher.

The control apparatus 200 determines that the ratio of the vehicles 100 not equipped with the driving support apparatus 160 at the certain technical level or higher in the area where the vehicle 100A is traveling is equal to or greater than the threshold (e.g., 0.5) (Step S322). The control apparatus 200 instructs the vehicle 100A to change a detection accuracy of the sensor via the communication unit 210 (Step S323). In the example illustrated in FIG. 13, the control apparatus 200 determines that the ratio of the vehicles 100 not equipped with the driving support apparatus 160 at the certain technical level or higher in the area where the vehicle 100A is traveling is equal to or greater than the threshold. Therefore, the control apparatus 200 instructs the vehicle 100A to change the setting to improve the detection accuracy of an arbitrary sensor used in the driving support apparatus 160.

When the vehicle 100A receives the instruction to change the detection accuracy of the sensor from the control apparatus 200 via the communication unit 140, the vehicle 100A changes the setting of the sensor in the mounting device 130 (Step S1122). For example, to change the setting for improving the detection accuracy of the arbitrary sensor, a specific sensor may be designated to change its detection accuracy. For example, the setting for improving the detection accuracy of the arbitrary sensor may be a setting for increasing a drive current, a setting for increasing a transmission power, or a setting for increasing a gain of an amplifier circuit. Here, the setting for increasing the gain of the amplifier circuit may be, for example, a setting for switching amplifier circuits with different gains. After changing the setting to improve the detection accuracy of the arbitrary sensor used in the driving support apparatus 160, the vehicle 100A transmits the ADAS information via communication unit 140 at the preset cycle or the cycle instructed from the control apparatus 200 (Step S1123 and Step S1124).

In addition, the setting to improve the detection accuracy of the arbitrary sensor may be changed on the basis of a time zone or weather. Further, the setting to improve the detection accuracy of the arbitrary sensor may be changed according to a brightness detected by the arbitrary sensor such as a camera. As a result, it is possible to operate each sensor with suitable detection accuracy even in a dark environment according to a time zone or weather.

When the control apparatus 200 receives the ADAS information from the vehicle 100A via the communication unit 210, the control apparatus 200 stores the received ADAS information in the storage unit 220 in time series. The control apparatus 200 can appropriately control traffic leading to reduced risks by setting a sensitivity of the sensor of the vehicle 100 to be high in an area where many vehicles 100 with low driving skills are distributed.

Modification (6) of Embodiment

Figure 14:
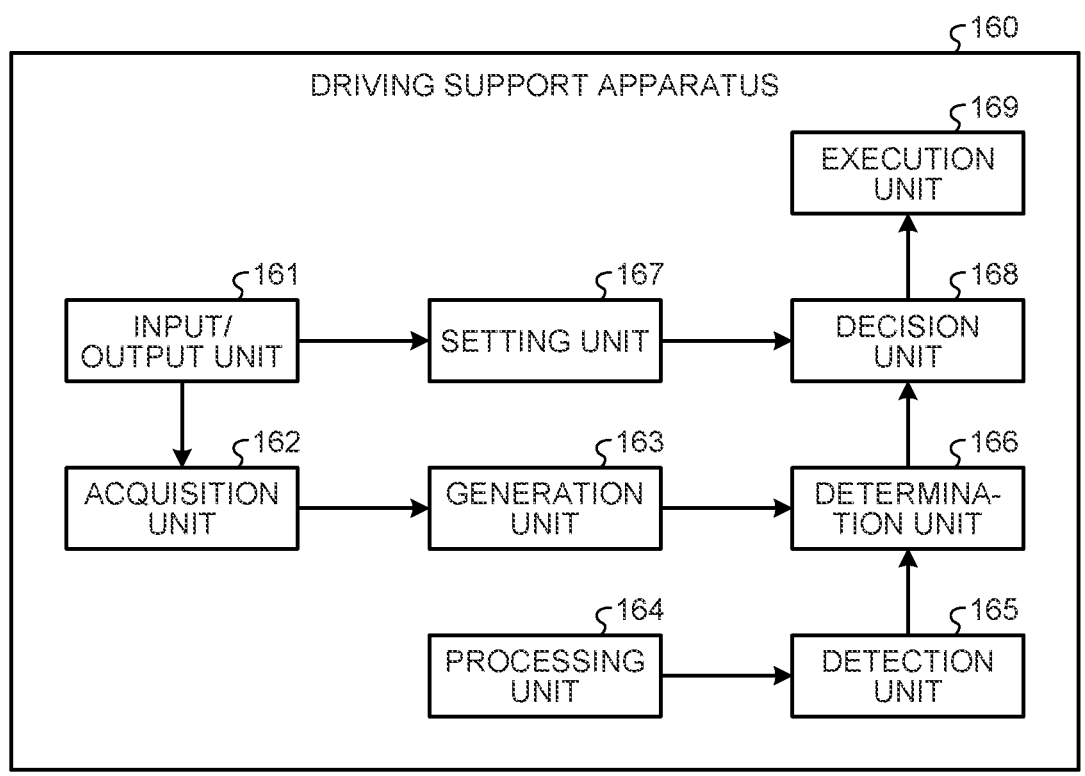
FIG. 14 is a diagram illustrating an example of a function of a driving support apparatus according to Modification (6) of the embodiment.

Next, Modification (6) of the embodiment will be described. FIG. 14 is a diagram illustrating an example of functions of the driving support apparatus 160 according to Modification (6) of the embodiment.

As illustrated in FIG. 14, the driving support apparatus 160 includes an input/output unit 161, an acquisition unit 162, a generation unit 163, a processing unit 164, a detection unit 165, a determination unit 166, a setting unit 167, a decision unit 168, and an execution unit 169.

The input/output unit 161 acquires information related to the driving support process from the control apparatus 200 via the communication unit 140, and transmits the information related to the driving support process to the control apparatus 200. The acquisition unit 162 acquires the V2X message transmitted from other vehicles 100 via the input/output unit 161. When receiving the V2X message including the information regarding positions of the surrounding vehicles 100 in the received V2X message, the generation unit 163 generates a list indicating the information regarding the positions of the surrounding vehicles 100.

Processing unit 164 processes information acquired from an arbitrary sensor connected to the driving support apparatus 160. For example, the processing unit 164 uses GNSS to acquire the position information of the own vehicle. The position information includes, for example, information such as latitude and longitude. Further, the processing unit 164 detects the vehicle 100 traveling ahead by the camera of the mounting device 130, and calculates the relative position from image information. The processing unit 164 can more accurately calculate the relative position of the vehicle 100 traveling ahead by utilizing distance measurement information using a radar in addition to the image information detected by the camera. In addition, the processing unit 164 may acquire the position information of the own vehicle and information related to the relative position with respect to surrounding objects using the position information detected by the GNSS, the image information detected by the camera of the mounting device 130, and three-dimensional map information called a dynamic map.

The detection unit 165 detects an absolute position of the vehicle 100 traveling ahead from the position information of the own vehicle and the relative position of the vehicle 100 traveling ahead acquired by the processing unit 164. The determination unit 166 determines whether the absolute position of vehicle 100 traveling ahead detected by the detection unit 165 is included in the list containing the information on positions of surrounding vehicles 100. For example, when the absolute position of the vehicle 100 traveling ahead is included in the list containing the information regarding the positions of the surrounding vehicles 100, the determination unit 166 determines that the vehicle 100 traveling ahead is the vehicle 100 equipped with the driving support apparatus 160. On the other hand, when the absolute position of the vehicle 100 traveling ahead is not included in the list containing the information on the positions of the surrounding vehicles 100, the determination unit 166 determines that the vehicle 100 traveling ahead is the vehicle 100 not equipped with the driving support apparatus 160.

The setting unit 167 sets a condition instructed by the control apparatus 200 via the input/output unit 161. For example, the setting unit 167 sets the condition to set the first inter-vehicle distance when the vehicle 100 traveling ahead is not equipped with the driving support apparatus 160, and set the second inter-vehicle distance when the vehicle 100 traveling ahead is equipped with the driving support apparatus 160.

The decision unit 168 sets the inter-vehicle distance to the vehicle 100 traveling ahead based on the determination result of the determination unit 166 and the condition set by the setting unit 167. For example, the condition set by the setting unit 167 is the condition to "set the first inter-vehicle distance when the vehicle 100 traveling ahead is not equipped with the driving support apparatus 160, and set the second inter-vehicle distance when the vehicle 100 traveling ahead is equipped with the driving support apparatus 160". In this case, when the determination result of the determination unit 166 is that "the vehicle 100 traveling ahead is not equipped with the driving support apparatus 160", the first inter-vehicle distance is decided. When the determination result of the determination unit 166 is that "the vehicle 100 traveling ahead is equipped with the driving support apparatus 160", the second inter-vehicle distance is decided. The execution unit 169 controls the power device, the braking device, the steering device, and the like of the drive system control unit 110 such that the inter-vehicle distance with respect to the vehicle 100 traveling ahead becomes the inter-vehicle distance decided by the decision unit 168.

The functional example of the driving support apparatus 160 according to Modification (6) of the embodiment has been described above. Note that the above-described function with reference to FIG. 14 is merely an example, and the function of the driving support apparatus 160 according to Modification (6) of the embodiment is not limited thereto. The function of the vehicle 100 according to Modification (6) of the embodiment can be flexibly modified according to specifications and operations.

Figure 15:
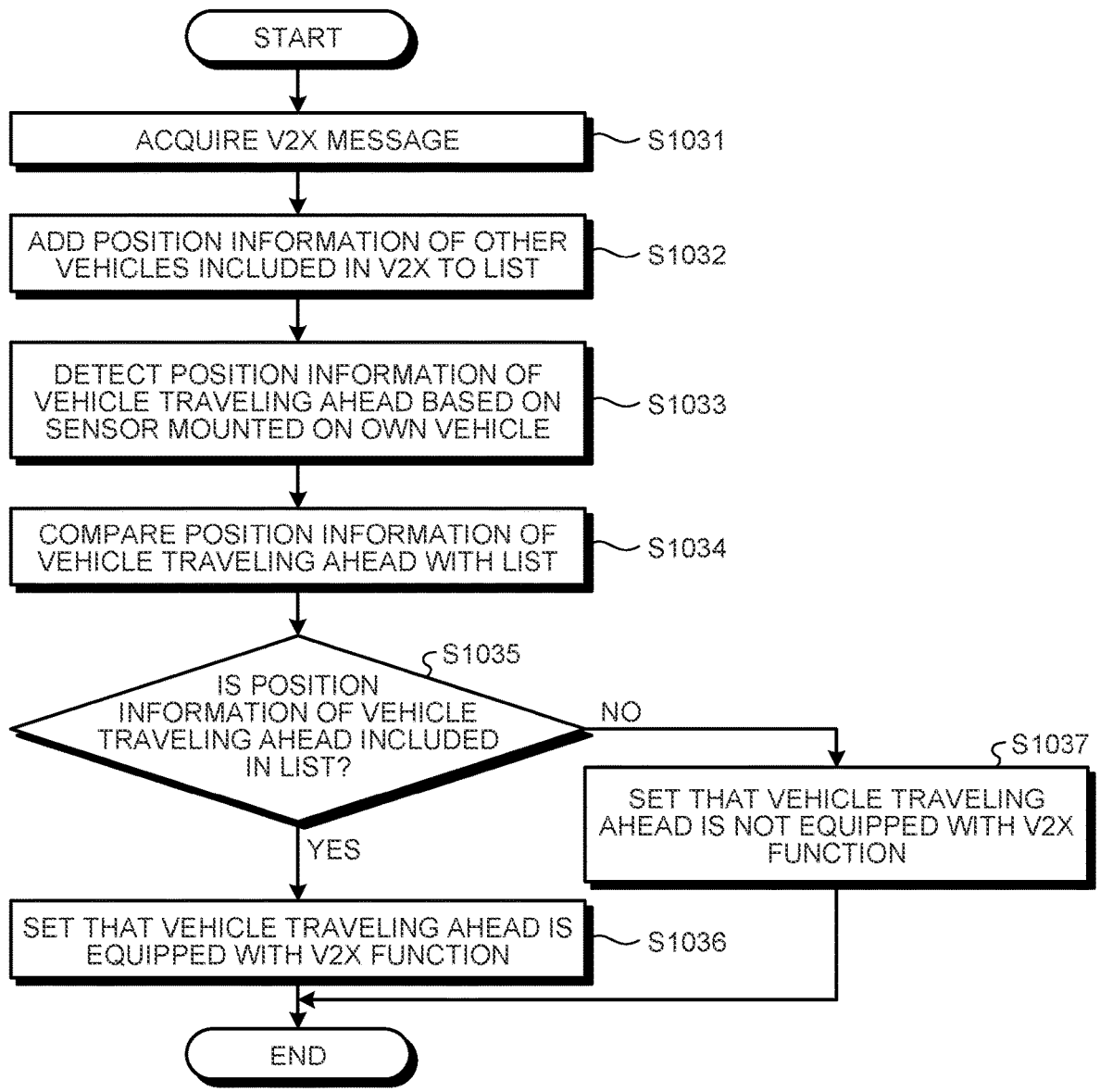
FIG. 15 is a flowchart illustrating an example of a process procedure of a driving support apparatus according to Modification (7) of the embodiment.

Process Procedure of Driving Support Apparatus According to Modification (7) of Embodiment FIG. 15 is a flowchart illustrating an example of a process procedure of the driving support apparatus 160 according to Modification (7) of the embodiment. The process procedure illustrated in FIG. 15 is realized by a program executed by the driving support apparatus 160. The process procedure illustrated in FIG. 15 is repeatedly executed by the driving support apparatus 160.

As illustrated in FIG. 15, the driving support apparatus 160 acquires the V2X message via the communication unit 140 (Step S1031). For example, the driving support apparatus 160 acquires the V2X message from other vehicles 100, the RSU 1002, or the like. Driving support apparatus 160 adds the position information of other vehicles 100 included in V2X to the list (Step S1032). In other words, the position information of the surrounding vehicles 100 equipped with the V2X function will be added to the list. The list is created based on one or more V2X messages obtained in a set period. When the set period has elapsed, the driving support apparatus 160 may reset the content of the list and reconstruct a list in the next period. In the list, the position information may be associated with information for identifying the vehicle corresponding to the position information. Here, as the information for identifying the vehicle, for example, the chassis number, the automobile registration number mark, the vehicle number label, and the like, can be used.

The driving support apparatus 160 detects the position information of the vehicle 100 traveling ahead based on a sensor mounted on the own vehicle (Step S1033). The driving support apparatus 160 compares the position information of the vehicle 100 traveling ahead with the list (Step S1034). The driving support apparatus 160 determines whether or not the position information of the vehicle 100 traveling ahead is included in the list based on a comparison result in Step S1034 (Step S1035).

When the driving support apparatus 160 determines that the position information of the vehicle 100 traveling ahead is included in the list (Yes in Step S1035), the driving support apparatus 160 advances the process to Step S1036. The driving support apparatus 160 sets that the vehicle 100 traveling ahead has the V2X function (Step S1036). Upon completion of the process in Step S1036, the driving support apparatus 160 ends the process procedure illustrated in FIG. 15.

When the driving support apparatus 160 determines that the position information of the vehicle 100 traveling ahead is not included in the list (No in Step S1035), the driving support apparatus 160 advances the process to Step S1037. The driving support apparatus 160 sets that the vehicle 100 traveling ahead is not equipped with the V2X function (Step S1037). Upon completion of the process in Step S1037, the driving support apparatus 160 ends the process procedure illustrated in FIG. 15.

When setting whether or not the vehicle 100 traveling ahead is equipped with the V2X function, the driving support apparatus 160 provides the setting result to the control apparatus 200 in association with the identification information of the vehicle 100. As a result, the traffic control system 1 does not require the control apparatus 200 to perform the process related to whether or not the V2X function is mounted on the surrounding vehicles 100, and thus, even when the number of vehicles 100 to be controlled increases, a load on the control apparatus 200 can be suppressed.

Modification (8) of Embodiment

Figure 16:
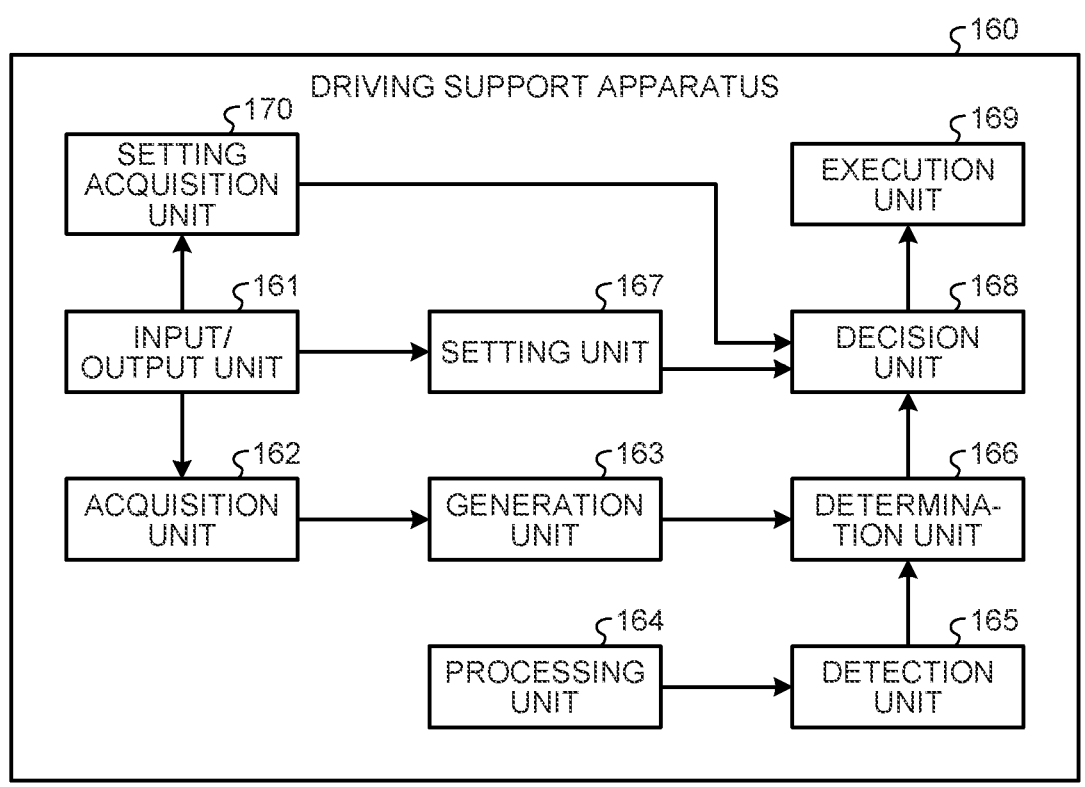
FIG. 16 is a diagram illustrating an example of the function of the driving support apparatus according to Modification (8) of the embodiment.

Next, Modification (8) of the embodiment will be described. FIG. 16 is a diagram illustrating an example of functions of the driving support apparatus 160 according to Modification (8) of the embodiment.

As illustrated in FIG. 16, the driving support apparatus 160 includes the input/output unit 161, the acquisition unit 162, the generation unit 163, the processing unit 164, the detection unit 165, the determination unit 166, the setting unit 167, the decision unit 168, the execution unit 169, and a setting acquisition unit 170. In other words, the driving support apparatus 160 further includes a function of the setting acquisition unit 170.

The setting acquisition unit 170 acquires a setting desired by a driver via the input/output unit 161. For example, the setting desired by the driver is to "extend the inter-vehicle distance from the vehicle 100 traveling ahead by 1 m". In this case, the decision unit 168 decides the inter-vehicle distance to the vehicle 100 traveling ahead based on the determination result of the determination unit 166, the condition set by the setting unit 167, and the desired setting acquired by the setting acquisition unit 170. For example, the setting desired by the driver is to "extend the inter-vehicle distance to the vehicle traveling behind by 1 m". In this case, the decision unit 168 decides the inter-vehicle distance to the vehicle 100 traveling behind based on the determination result of determination unit 166, the condition set by the setting unit 167, and the desired setting acquired by the setting acquisition unit 170.

The execution unit 169 executes a process of instructing the vehicle 100 traveling ahead or behind to change to the decided inter-vehicle distance. The execution unit 169 transmits a request for giving an instruction to change the inter-vehicle distance to the applicable vehicle 100, for example, via the communication unit 140. As a result, the driving support apparatus 160 can change the inter-vehicle distance between the own vehicle and the vehicle 100 traveling ahead or behind. Note that the execution unit 169 may transmit the decided inter-vehicle distance to other vehicles 100 via, for example, the control apparatus 200, the RSU 1002, or the like, instead of directly transmitting the decided inter-vehicle distance to other vehicles 100.

The driving support apparatus 160 can change the relative position between the surrounding vehicles 100 falling under the condition and the own vehicle on the basis of the setting desired by the driver. As a result, the driving support apparatus 160 can assist driving of the own vehicle and the surrounding vehicles 100 so as to maintain the relative position desired by the driver.

Modification (9) of Embodiment

Figure 17:
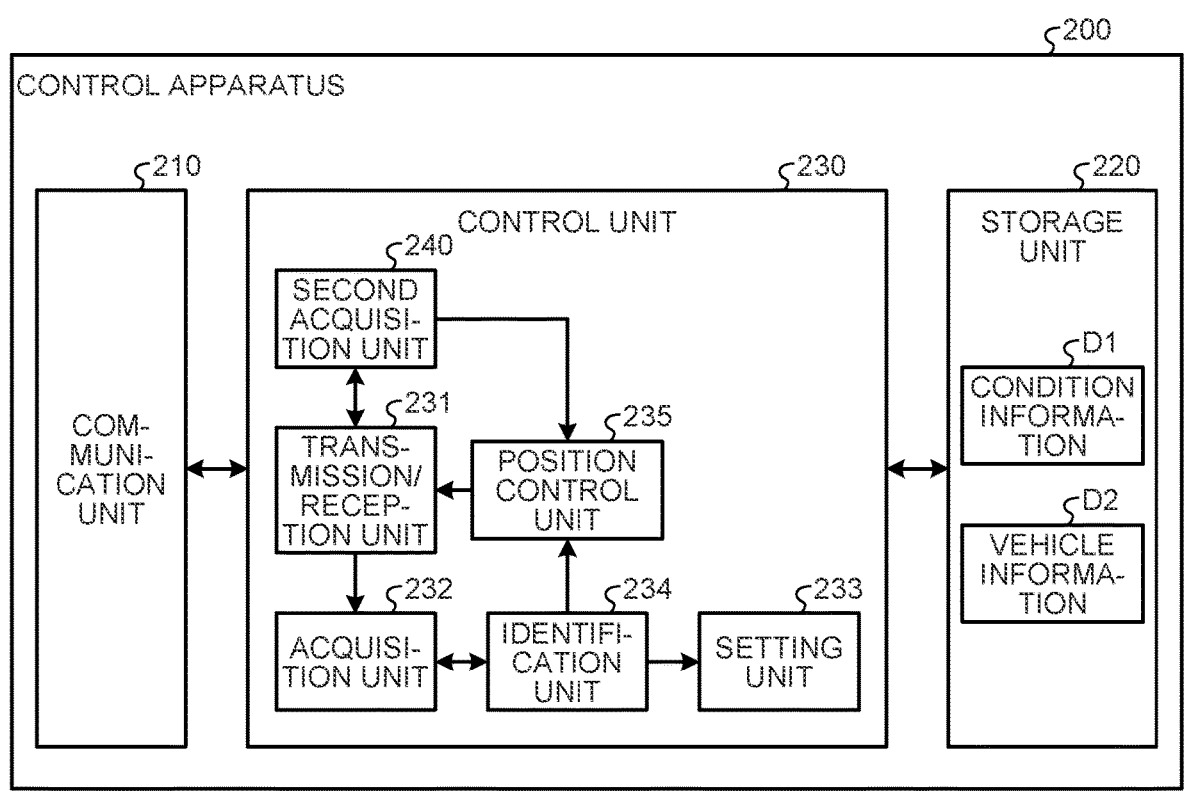
FIG. 17 is a diagram illustrating an example of the configuration of the control apparatus according to Modification (9) of the embodiment.

Next, Modification (9) of the embodiment will be described. FIG. 17 is a diagram illustrating an example of a configuration of the control apparatus 200 according to Modification (9) of the embodiment. As illustrated in FIG. 17, the control apparatus 200 includes the communication unit 210, the storage unit 220, and the control unit 230. The control unit 230 includes the transmission/reception unit 231, the acquisition unit 232, the setting unit 233, the identification unit 234, the position control unit 235, and a second acquisition unit 240. The functional units of the transmission/reception unit 231, the acquisition unit 232, the setting unit 233, the identification unit 234, the position control unit 235, and the second acquisition unit 240 are implemented, for example, by the control unit 230 executing the program stored in the control unit 230 using the RAM or the like as the work area. In other words, the second acquisition unit 240 is added to the control unit 230 in the configuration of the embodiment.

The second acquisition unit 240 acquires information related to control of a traffic light via the transmission/reception unit 231. In other words, the control apparatus 200 causes the second acquisition unit 240 to acquire information on timing at which an arbitrary traffic light turns blue, yellow, or red.

The position control unit 235 controls an inter-vehicle distance between the vehicle 100 identified by the identification unit 234 and the vehicle 100 traveling ahead. Furthermore, the position control unit 235 controls the inter-vehicle distance to the vehicle 100 traveling ahead in consideration of the information regarding the timing at which the traffic light changes acquired by the second acquisition unit 240. For example, when the timing that the traffic light ahead in a road on which the vehicle 100 traveling ahead or the control target vehicle travels will turn red is within a certain threshold, the position control unit 235 stops issuing the instruction to change the inter-vehicle distance.

Furthermore, the position control unit 235 may transmit an instruction to permit or prohibit the lane change to the vehicle 100 traveling in the adjacent lane in addition to controlling the inter-vehicle distance to the vehicle 100 traveling ahead to the vehicle 100 identified by the identification unit 234. For example, when the timing that the traffic light ahead in a road on which the vehicle 100 traveling ahead or the control target vehicle 100 travels will turn red is within the certain threshold, the position control unit 235 transmits an instruction to prohibit the lane change to the vehicles 100 traveling in a certain range of the adjacent lane via the transmission/reception unit 231. Here, the position control unit 235 may transmit the V2X message including the instruction to prohibit the lane change to the identified vehicle 100. In other words, the position control unit 235 can suppress the lane change of the vehicles traveling around the own vehicle by instructing the control target vehicle 100 to transmit the V2X message including the instruction to prohibit the lane change to the surrounding.

In addition, the second acquisition unit 240 may broadly acquire road conditions. For example, the second acquisition unit 240 acquires information regarding the presence of the vehicle 100 stopped due to a failure or an accident on the road or an obstacle such as a falling object on the road. For example, the position control unit 235 can control the inter-vehicle distance to the vehicle 100 traveling ahead in consideration of the information regarding the obstacle on the road ahead acquired by the second acquisition unit 240. For example, a position of the obstacle ahead on the road on which the vehicle 100 traveling ahead or the control target vehicle 100 travels is in a distance within a certain threshold. In this case, the position control unit 235 can stop issuing an instruction to change the inter-vehicle distance. Furthermore, the position of the obstacle ahead on the road on which the vehicle 100 traveling ahead or the control target vehicle 100 travels is in the distance within the certain threshold. In this case, the position control unit 235 can transmit an instruction to prohibit the lane change to the vehicles 100 traveling in a certain range of the adjacent lane via the transmission/reception unit 231.

In addition, the second acquisition unit 240 may acquire information related to weather. For example, the second acquisition unit 240 acquires information on a rainfall or snowfall area. The position control unit 235 may perform control, for example, to set a fourth inter-vehicle distance of extending the inter-vehicle distance with respect to the vehicles 100 traveling in the rainfall or snowfall area.

Further, the second acquisition unit 240 may acquire information related to the road surface condition (e.g., dry, semi-wet, wet, snowy, pressed snow, frozen, sherbet-like road surface, and the like). For example, the second acquisition unit 240 acquires information related to freezing of the road surface. The position control unit 235 may control the vehicles 100 traveling in an area including the frozen road surface to, for example, set the fourth inter-vehicle distance, so as to extend the inter-vehicle distance.

Modification (10) of Embodiment

Figure 18:
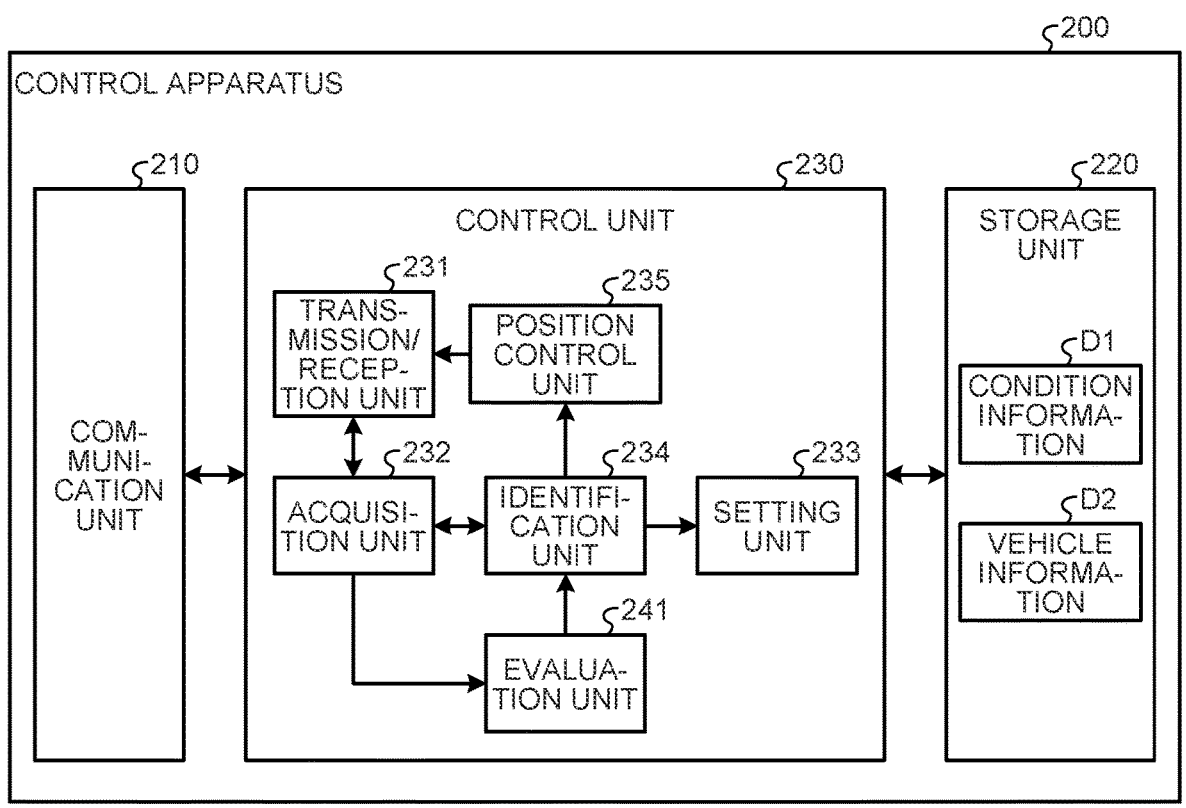
FIG. 18 is a diagram illustrating an example of the configuration of the control apparatus according to Modification (10) of the embodiment.

Next, Modification (10) of the embodiment will be described. FIG. 18 is a diagram illustrating an example of a configuration of the control apparatus 200 according to Modification (10) of the embodiment. As illustrated in FIG. 18, the control apparatus 200 includes the communication unit 210, the storage unit 220, and the control unit 230. The control unit 230 includes the transmission/reception unit 231, the acquisition unit 232, the setting unit 233, the identification unit 234, the position control unit 235, and an evaluation unit 241. Each functional unit of the transmission/reception unit 231, the acquisition unit 232, the setting unit 233, the identification unit 234, the position control unit 235, and the evaluation unit 241 is realized, for example, by the control unit 230 executing the program stored in the control unit 230 using the RAM or the like as the work area. In other words, the evaluation unit 241 is added to the control unit 230 in the configuration of the embodiment.

The evaluation unit 241 evaluates driving characteristics of each vehicle 100 according to the level corresponding to the driving support apparatus 160. The driving characteristics mean, for example, a character, a level, and the like of a technology for supporting driving, a driving skill of a human driver, an autonomous driving technology, and the like. The evaluation unit 241 can evaluate both human driving and autonomous driving levels. In the present embodiment, an example of evaluating the driving characteristics when the control apparatus 200 assists driving of the vehicle 100 will be described.

For example, levels corresponding to the driving support apparatus 160 include level 0, level 1, level 2, level 3, level 4, level 5, and the like. Level 0 means that, for example, the driver operates everything. The level 1 means that, for example, the driving support apparatus 160 supports either steering operation or acceleration/deceleration. Level 2 means that, for example, the driving support apparatus 160 supports the steering operation and acceleration/deceleration. Level 3 means that, for example, the driving support apparatus 160 operates everything in a specific place, and the driver operates in emergency occasions. Level 4 means that, for example, the driving support apparatus 160 operates everything in the specific place. Level 5 means that, for example, the driving support apparatus 160 operates everything without limitation of places.

The evaluation unit 241 may evaluate the driving characteristics of each vehicle 100 by utilizing the information of each sensor acquired by the acquisition unit 232. For example, the evaluation unit 241 counts the number of times of sudden brakes by utilizing the information of the acceleration sensor, and lowers the evaluation of the driving characteristics as the number of times increases. For example, the evaluation unit 241 uses information from the camera to identify the vehicle 100 that has caused sudden braking, and lowers the evaluation of the driving characteristics of that vehicle 100. The identification unit 234 acquires the evaluation of the driving characteristics of the vehicle 100 traveling ahead via the evaluation unit 241. The position control unit 235 sets the inter-vehicle distance on the basis of the evaluation of the driving characteristics of the vehicle 100 traveling ahead identified by the identification unit 234.

When the control apparatus 200 controls the relative position of the vehicle 100, the control apparatus 200 can suppress a risk of traffic accident by setting the inter-vehicle distance in consideration of the evaluation result of the evaluation unit 241. In addition, the control apparatus 200 can contribute to improvement of the driving characteristics by providing the evaluation result to the driving support apparatus 160, the driver, and the like. Furthermore, the control apparatus 200 may provide the evaluation result to the insurance premium calculation unit 239 to calculate the insurance premium according to the driving skill of each vehicle 100.

Note that Modifications (1) to (10) of the embodiment may be applied to the traffic control system 1, the control apparatus 200, and the driving support apparatus 160 of other embodiments and modifications.

Hardware Configuration

Figure 19:
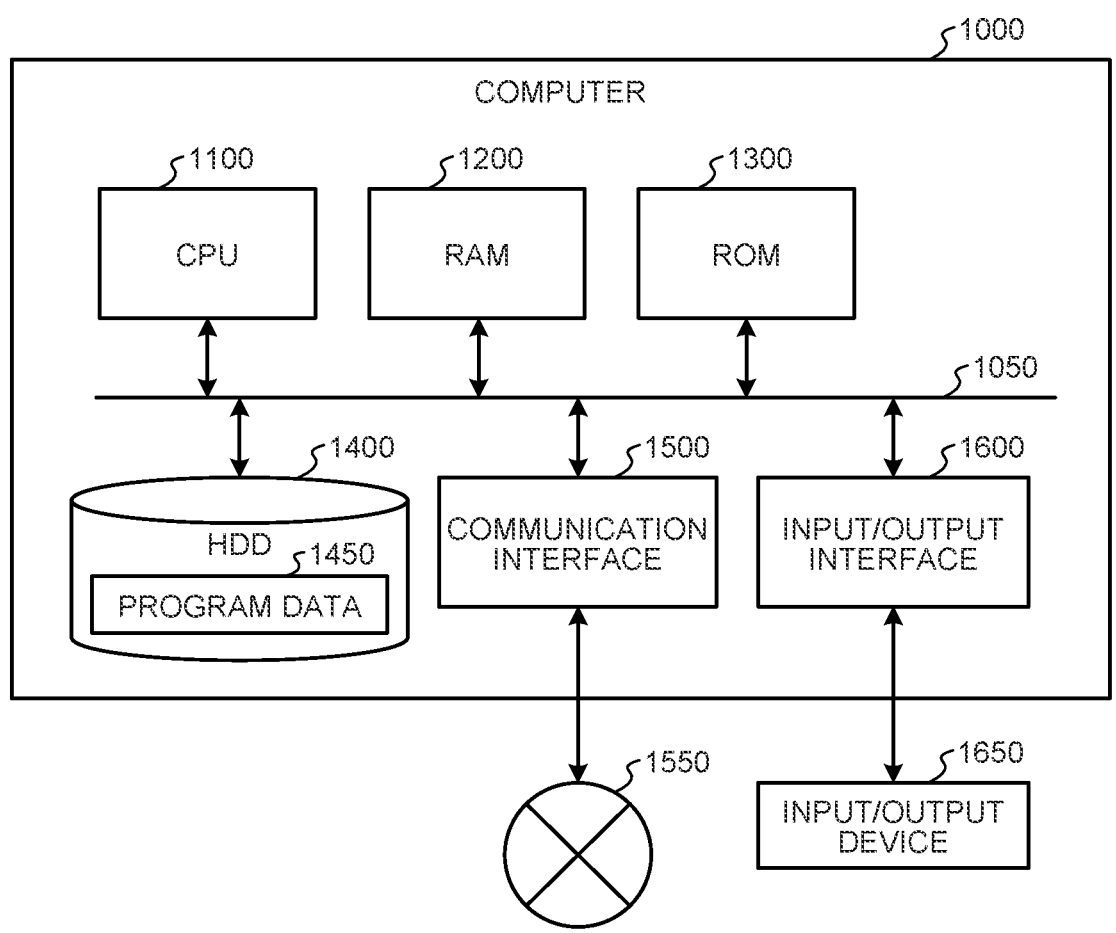
FIG. 19 is a hardware configuration diagram illustrating an example of a computer that implements the function of the control apparatus.

The control apparatus 200 and the driving support apparatus 160 according to the present embodiment described above may be realized by, for example, a computer 1000 having a configuration as illustrated in FIG. 19. Hereinafter, the control apparatus 200 according to the embodiment will be described as an example. FIG. 19 is a hardware configuration diagram illustrating an example of the computer 1000 that implements the function of the control apparatus 200. The computer 1000 includes a CPU 1100, a RAM 1200, a read only memory (ROM) 1300, a hard disk drive (HDD) 1400, a communication interface 1500, and an input/output interface 1600. Each unit of the computer 1000 is connected by a bus 1050.

The CPU 1100 operates on the basis of a program stored in the ROM 1300 or the HDD 1400, and controls each unit. For example, the CPU 1100 develops a program stored in the ROM 1300 or the HDD 1400 in the RAM 1200, and executes processing corresponding to various programs.

The ROM 1300 stores a boot program such as a basic input output system (BIOS) executed by the CPU 1100 when the computer 1000 is activated, a program dependent on hardware of the computer 1000, and the like.

The HDD 1400 is a computer-readable recording medium that non-transiently records a program executed by the CPU 1100, data used by the program, and the like. Specifically, the HDD 1400 is a recording medium that records the information processing program according to the present disclosure, which is an example of program data 1450.

The communication interface 1500 is an interface for the computer 1000 to connect to an external network 1550 (e.g., the Internet). For example, the CPU 1100 receives data from another apparatus or transmits data generated by the CPU 1100 to another apparatus via the communication interface 1500.

The input/output interface 1600 is an interface for connecting an input/output device 1650 and the computer 1000. For example, the CPU 1100 receives data from an input device such as a keyboard or a mouse via the input/output interface 1600. In addition, the CPU 1100 transmits data to an output device such as a display, a speaker, or a printer via the input/output interface 1600. Furthermore, the input/output interface 1600 may function as a media interface that reads a program or the like recorded in a predetermined recording medium (medium). The medium is, for example, an optical recording medium such as a digital versatile disc (DVD), a magneto-optical recording medium such as a magneto-optical disk (MO), a tape medium, a magnetic recording medium, a semiconductor memory, or the like.

For example, in a case where the computer 1000 functions as the control apparatus 200 according to the embodiment, the CPU 1100 of the computer 1000 executes the program loaded on the RAM 1200 to implement the functions of the transmission/reception unit 231, the acquisition unit 232, the setting unit 233, the identification unit 234, the position control unit 235, the ratio calculation unit 236, the route calculation unit 237, the route acquisition unit 238, the insurance premium calculation unit 239, the second acquisition unit 240, the evaluation unit 241, and the like of the control unit 230. In addition, the HDD 1400 stores the program according to the present disclosure and the data in the storage unit 220. Note that the CPU 1100 reads the program data 1450 from the HDD 1400 and executes the program data, but as another example, these programs may be acquired from another device via the external network 1550.

Although the preferred embodiment of the present disclosure has been described in detail with reference to the accompanying drawings, the technical scope of the present disclosure is not limited to such examples. It is obvious that a person having ordinary knowledge in the technical field of the present disclosure can conceive various changes or modifications within the scope of the technical idea described in the claims, and it is naturally understood that these also belong to the technical scope of the present disclosure.

Furthermore, the effects described in the present specification are merely illustrative or exemplary, and are not restrictive. In other words, the technology according to the present disclosure can exhibit other effects obvious to those skilled in the art from the description of the present specification together with or instead of the above effects.

Furthermore, it is also possible to create a program for causing hardware such as a CPU, a ROM, and a RAM built in a computer to exhibit a function equivalent to the configuration of the control apparatus 200, and provide a computer-readable recording medium in which the program is recorded.

In addition, each step related to the process of the traffic control system 1 of the present specification is not necessarily processed in chronological order according to the order described in the sequence. For example, each step related to the process of the traffic control system 1 may be processed in an order different from the order described in the sequence, or may be processed in parallel.

In addition, this specification refers to a case where the control apparatus 200 is a cloud server in the traffic control system 1. However, the traffic control system 1 is not limited thereto. For example, in the traffic control system 1, the function of the control apparatus 200 may be realized by the driving support apparatus 160, the electronic control unit, or the like of the vehicle 100 or the RSU 1002. In addition, the traffic control system 1 may implement the control apparatus 200 in a dynamic proximity edge server using a technique called mobile edge computing (MEC). Furthermore, each unit of the control apparatus 200 may be mounted in a distributed manner on different servers.

Furthermore, the present specification refers to a case where the driving support apparatus 160 is realized by the electronic control unit of the vehicle 100. However, the present disclosure is not limited thereto. The driving support apparatus 160 may be realized by, for example, other electronic control units such as a mounting device, a communication device, a drive system control unit 510, and the body system control unit 120 mounted on the vehicle 100.

(Effects)

The traffic control system 1 includes the identification unit 234 that identifies the vehicle 100 falling under the predetermined condition that has been set, the position control unit 235 that sets the relative position between the vehicle 100 and surrounding vehicles around the vehicle 100 based on the relative distance between the identified vehicle 100 and the surrounding vehicles, and the control unit 230 that generates the control information for controlling movement of the vehicle according to the relative position.

As a result, when the vehicle 100 falling under the predetermined condition that has been set is identified, the traffic control system 1 can set an appropriate relative position according to a relative distance to the surrounding vehicles. The traffic control system 1 can control the movement of the vehicle 100 based on the control information by generating the control information according to the set relative distance. As a result, the traffic control system 1 can support the driving in which the relative positions of the plurality of vehicles 100 are maintained even when the vehicles 100 having different driving levels are mixed. Accordingly, safety can be improved.

In the traffic control system 1, the control unit 230 generates the control information for controlling at least one of the vehicle 100 and the surrounding vehicles based on the relative positions between the vehicle 100 and the surrounding vehicles.

As a result, the traffic control system 1 can maintain the relative positions of the vehicle 100 and the surrounding vehicles by controlling at least the vehicle 100 or the surrounding vehicles. As a result, the traffic control system 1 controls at least the vehicle 100 or the surrounding vehicles to maintain the relative positions, so that safety can be improved even when the plurality of vehicles 100 having different driving levels are mixed.

In the traffic control system 1, the position control unit 235 determines the characteristic of the surrounding vehicles on the basis of the predetermined condition, and sets the relative position between the vehicle and the surrounding vehicle on the basis of the determined characteristic.

As a result, the traffic control system 1 can set the relative position between the vehicle and the surrounding vehicles according to the characteristics of the surrounding vehicles around the identified vehicle. As a result, by considering the characteristics of the surrounding vehicles, the traffic control system 1 can improve safety even when the plurality of vehicles 100 having different driving levels are mixed.

In the traffic control system 1, the position control unit 235 sets the first inter-vehicle distance when the surrounding vehicles satisfy the predetermined condition, and sets the second inter-vehicle distance when the surrounding vehicles do not satisfy the predetermined condition.

As a result, the traffic control system 1 can determine the characteristics of the surrounding vehicles on the basis of the predetermined condition, set the first inter-vehicle distance when the predetermined condition is satisfied, and set the second inter-vehicle distance when the predetermined condition is not satisfied. As a result, the traffic control system 1 can set the inter-vehicle distance suitable for the characteristics of the surrounding vehicles only by determining whether or not the surrounding vehicles satisfy the predetermined condition. Accordingly, the relative positions of the plurality of vehicles 100 can be easily set.

In the traffic control system 1, the first inter-vehicle distance is less than the second inter-vehicle distance.

As a result, the traffic control system 1 can set a shorter inter-vehicle distance when the predetermined condition is satisfied, compared with when the predetermined condition is not satisfied. As a result, by setting the condition regarding the safety of the vehicle 100 as the predetermined condition, the traffic control system 1 can change the inter-vehicle distance according to the safety of the plurality of vehicles 100.

In the traffic control system 1, the first inter-vehicle distance and the second inter-vehicle distance are inter-vehicle distances that increase as the legal speed of the traveling road increases. In addition, the first inter-vehicle distance and the second inter-vehicle distance may be dynamically changed according to the time zone and weather. For example, at night, the first inter-vehicle distance and the second inter-vehicle distance longer than those in daytime are set, and in a rainy environment, the first inter-vehicle distance and the second inter-vehicle distance wider than those in a sunny environment are set.

As a result, the traffic control system 1 can increase the inter-vehicle distance between the vehicle 100 and the surrounding vehicles as the legal speed increases. As a result, even when the vehicle 100 travels in sections with different legal speeds, the traffic control system 1 can dynamically control the vehicle 100 to maintain an appropriate relative position with respect to surrounding vehicles. Accordingly, safety can be improved.

In the traffic control system 1, the predetermined condition is a condition for identifying vehicles that is not transmitting a message including at least position information of the vehicle.

As a result, the traffic control system 1 can identify the vehicles 100 that do not transmit the message including the position information. As a result, the traffic control system 1 can set the dedicated inter-vehicle distance to the surrounding vehicles that do not have a specific function. Accordingly, safety can be improved.

In the traffic control system 1, the predetermined condition is a condition for identifying vehicles not covered by the insurance.

As a result, the traffic control system 1 can identify, for example, the vehicles 100 not covered by the insurance with the predetermined compensation amount or higher. As a result, since the traffic control system 1 can set the dedicated inter-vehicle distance to the surrounding vehicles not covered by the insurance, the possibility of preventing an accident with the vehicles not covered by the insurance can be improved.

The traffic control system 1 further includes the evaluation unit 241 that evaluates the driving characteristics. The predetermined condition is a condition for determining whether the driving characteristics that have been preset are satisfied. The identification unit 234 identifies the vehicles 100 that do not satisfy the driving characteristics based on the evaluation result of the evaluation unit 241.

As a result, the traffic control system 1 can identify the vehicles 100 that do not satisfy the driving condition based on the evaluation result of the evaluation unit 241. As a result, since the traffic control system 1 can set the inter-vehicle distance suitable for the driving characteristics, safety can be improved even when the vehicles 100 having different driving characteristics are mixed.

In the traffic control system 1, the position control unit 235 sets the travel route of the vehicle 100 that does not include areas in which the ratio of the vehicles 100 falling under the predetermined condition is equal to or greater than the preset threshold.

As a result, the traffic control system 1 can set the travel route of the vehicle 100 so as not to include areas where many vehicles 100 with low driving characteristics are distributed. As a result, the traffic control system 1 can support more appropriate driving of the vehicle 100 by suppressing traveling in areas where many vehicles 100 having low driving characteristics are distributed.

In the traffic control system 1, the position control unit 235 instructs the vehicle 100 to increase the transmission frequency of the information related to the sensor mounted on the vehicle 100 with respect to the vehicle 100 traveling inside the area where the ratio is equal to or greater than the preset threshold.

As a result, the traffic control system 1 can collect more pieces of information related to the sensor from the vehicles 100 traveling inside the area where the ratio is equal to or greater than the preset threshold. As a result, the traffic control system 1 can improve the setting of the appropriate relative positions of the vehicles 100 to reduce risks by acquiring information regarding many sensors from the areas where many vehicles 100 with low driving skills are distributed.

The traffic control system 1 further includes the insurance premium calculation unit 239 that calculates the insurance premium of the vehicle 100 on the basis of a traveling result of whether the vehicle 100 has traveled inside the area.

As a result, the traffic control system 1 can calculate the insurance premium based on the traveling result in each area having different driving characteristic distributions of the vehicles 100. As a result, the traffic control system 1 can calculate the insurance premium according to the risk of the vehicle 100 in each area.

In the traffic control system 1, the insurance premium calculation unit 239 calculates the insurance premium of the vehicle 100 traveling inside the area to be higher than the insurance premium of the vehicle 100 not traveling inside the area.

As a result, the traffic control system 1 can calculate the insurance premium of the vehicle 100 traveling inside the area to be higher than the insurance premium of the vehicle 100 not traveling inside the area. As a result, the traffic control system 1 can support the setting of the insurance premium of the vehicle 100 by calculating the insurance premium suitable for the traveling result of the vehicle 100.

In the traffic control system 1, the predetermined condition is a condition for determining the low-fuel-consumption travel of the vehicle 100, and the position control unit 235 sets relative positions between the identified vehicle 100 and surrounding vehicles to relative positions corresponding to the low-fuel-consumption travel.

As a result, when the vehicle 100 corresponding to the low-fuel-consumption travel is identified, the traffic control system 1 can change the relative position between the vehicle 100 and the surrounding vehicles so as to improve the fuel consumption of the vehicles 100. As a result, the traffic control system 1 can support driving that maintains the relative positions of the plurality of vehicles 100 and support improvement of the fuel consumption of the vehicle 100.

In the traffic control system 1, the predetermined condition is a condition for determining the vehicle that has the value indicating the environment of the vehicle 100 equal to or greater than the preset threshold, and the position control unit 235 changes the relative position between the identified vehicle 100 and the vehicle 100 traveling ahead according to the environment of the vehicle 100.

As a result, when the traffic control system 1 identifies the vehicle 100 whose value indicating the environment of the vehicle 100 is equal to or greater than the preset threshold, the relative position between the applicable vehicle 100 and the vehicle 100 traveling ahead can be changed according to the environment of the applicable vehicle 100. For example, the traffic control system 1 can change the relative position according to the environment based on the air resistance value of the vehicle 100. As a result, the traffic control system 1 can support driving that maintains the relative positions of the plurality of vehicles 100 and support improvement of the fuel consumption of the vehicle 100.

A traffic control method includes, in a computer, identifying the vehicle 100 that falls under the predetermined condition that has been set, setting the relative position between the vehicle 100 and the surrounding vehicles around the identified vehicle 100 on the basis of the relative distance between the identified vehicle 100 and the surrounding vehicles, and generating the control information for controlling movement of the vehicle 100 according to the relative position.

As a result, when the computer identifies the vehicle 100 falling under the predetermined condition set, the traffic control method can set an appropriate relative position according to the relative distance to the surrounding vehicles. The traffic control system 1 can control the movement of the vehicle 100 based on the control information by generating the control information according to the set relative distance. As a result, the traffic control method can support the driving to maintain the relative positions of the plurality of vehicles 100 even when the vehicles 100 having different driving levels are mixed. Accordingly, the safety can be improved.

The control apparatus 200 includes the identification unit 234 that identifies the vehicle 100 falling under the predetermined condition, that has been set, and the position control unit 235 that sets the relative position between the vehicle 100 and surrounding vehicles around the vehicle 100 based on the relative distance between the identified vehicle 100 and the surrounding vehicles around the vehicle. The position control unit 235 controls the movement of the vehicle 100 so as to achieve the set relative position.

As a result, when the vehicle 100 that falls under the predetermined condition set is identified, the control apparatus 200 can set an appropriate relative position according to the relative distance to the surrounding vehicles. The control apparatus 200 can control movement of the vehicle 100 so as to achieve the set relative position. As a result, even when the vehicles 100 having different driving levels are mixed, the control apparatus 200 can control the driving to maintain the relative positions of the plurality of vehicles 100. Accordingly, safety can be improved.

In the control apparatus 200, the position control unit 235 controls at least one of the vehicle 100 and the surrounding vehicles based on the relative positions between the vehicle 100 and the surrounding vehicles.

As a result, the control apparatus 200 can maintain the relative positions of the vehicle 100 and the surrounding vehicles by controlling at least one of the vehicle 100 and the surrounding vehicles. As a result, the control apparatus 200 controls at least one of the vehicle 100 and the surrounding vehicles to maintain the relative positions, so that safety can be improved even when the plurality of vehicles 100 having different driving levels are mixed.

In the control apparatus 200, the position control unit 235 determines the characteristic of the surrounding vehicles on the basis of the predetermined condition, and sets the relative positions between the vehicle 100 and the surrounding vehicles on the basis of the determined characteristic.

As a result, the control apparatus 200 can set the relative positions between the vehicle 100 and the surrounding vehicles according to the characteristics of the surrounding vehicles of the identified vehicle 100. As a result, by considering characteristics of surrounding vehicles, the control apparatus 200 can improve safety even when the plurality of vehicles 100 having different driving levels are mixed.

Note that the following configurations also belong to the technical scope of the present disclosure.

(1)
A traffic control system comprising:
an identification unit that identifies a vehicle falling under a predetermined condition that has been set;
a position control unit that sets a relative position between the vehicle identified and a surrounding vehicle around the vehicle based on a relative distance between the vehicle and the surrounding vehicle; and
a control unit that generates control information for controlling movement of the vehicle according to the relative position.

(2)
The traffic control system according to (1), wherein
the control unit generates the control information for controlling at least one of the vehicle and the surrounding vehicle based on the relative position between the vehicle and the surrounding vehicle.

(3)
The traffic control system according to (1) or (2), wherein
the position control unit determines a characteristic of the surrounding vehicle based on the predetermined condition, and sets the relative position between the vehicle and the surrounding vehicle based on the determined characteristic.

(4)
The traffic control system according to any one of (1) to (3), wherein
the position control unit sets a first inter-vehicle distance when the surrounding vehicle satisfies the predetermined condition, and sets a second inter-vehicle distance when the surrounding vehicle does not satisfy the predetermined condition.

(5)
The traffic control system according to (4), wherein
the first inter-vehicle distance is less than the second inter-vehicle distance.

(6)
The traffic control system according to (4) or (5), wherein
the first inter-vehicle distance and the second inter-vehicle distance are inter-vehicle distances that increase as a legal speed of a traveling road increases.

(7)
The traffic control system according to any one of (1) to (6), wherein
the predetermined condition is a condition for identifying a vehicle that is not transmitting a message including at least position information of the vehicle.

(8)
The traffic control system according to any one of (1) to (7), wherein
the predetermined condition is a condition for identifying a vehicle not covered by an insurance.

(9)
The traffic control system according to any one of (1) to (8), further comprising an evaluation unit that evaluates a driving characteristic, wherein
the predetermined condition is a condition for determining whether a driving characteristic that has been preset is satisfied, and
the identification unit identifies the vehicle that does not satisfy the driving characteristic based on an evaluation result of the evaluation unit.

(10)
The traffic control system according to any one of (1) to (9), wherein
the position control unit sets a travel route of the vehicle, and the travel route does not include an area in which a ratio of the vehicle falling under the predetermined condition is equal to or greater than a preset threshold.

(11)
The traffic control system according to (10), wherein
the position control unit instructs the vehicle traveling inside the area having the ratio equal to or greater than the preset threshold to increase a transmission frequency of information related to a sensor mounted on the vehicle.

(12)
The traffic control system according to (10) or (11), further comprising an insurance premium calculation unit that calculates an insurance premium of the vehicle based on a traveling result of whether the vehicle has traveled inside the area.

(13)
The traffic control system according to (12), wherein
the insurance premium calculation unit calculates the insurance premium of the vehicle that has traveled inside the area to be higher than the insurance premium of the vehicle that has not traveled inside the area.

(14)
The traffic control system according to any one of (1) to (13), wherein
the predetermined condition is a condition for determining a low-fuel-consumption travel of the vehicle, and the position control unit sets the relative position between the vehicle identified and the surrounding vehicle to the relative position corresponding to the low-fuel-consumption travel.

(15)

The traffic control system according to any one of (1) to (14), wherein the predetermined condition is a condition for determining the vehicle that has a value indicating an environment of the vehicle equal to or greater than a preset threshold, and the position control unit changes the relative position between the vehicle identified and the vehicle traveling ahead according to the environment of the vehicle.

(16)

A traffic control method causing a computer to implement:

identifying a vehicle falling under a predetermined condition that has been set;

setting a relative position between the vehicle identified and a surrounding vehicle around the vehicle based on a relative distance between the vehicle and the surrounding vehicle; and generating control information for controlling movement of the vehicle according to the relative position.

(17)

A control apparatus comprising:

an identification unit that identifies a vehicle falling under a predetermined condition that has been set; and a position control unit that sets a relative position between the vehicle identified and a surrounding vehicle around the vehicle based on a relative distance between the vehicle and the surrounding vehicle, wherein the position control unit controls movement of the vehicle so as to achieve the relative position set.

(18)

The control apparatus according to (17), wherein the position control unit controls at least one of the vehicle and the surrounding vehicle based on the relative position between the vehicle and the surrounding vehicle.

(19)

The control apparatus according to (17) or (18), wherein the position control unit determines a characteristic of the surrounding vehicle based on the predetermined condition, and sets the relative position between the vehicle and the surrounding vehicle based on the determined characteristic.

REFERENCE SIGNS LIST

1 Traffic Control System
100 Vehicle
130 Mounting Device
140 Communication Unit
150 Storage Unit
160 Driving Support Apparatus
161 Input/Output Unit
162 Acquisition Unit
163 Generation Unit
164 Processing Unit
165 Detection Unit
166 Determination Unit
167 Setting Unit
168 Decision Unit
169 Execution Unit
170 Setting Acquisition Unit
200 Control Apparatus
210 Communication Unit
220 Storage Unit
230 Control Unit
231 Transmission/Reception Unit
232 Acquisition Unit
233 Setting Unit
234 Identification Unit
235 Position Control Unit
236 Ratio Calculation Unit
237 Route Calculation Unit
238 Route Acquisition Unit
239 Insurance Premium Calculation Unit
240 Second Acquisition Unit
241 Evaluation Unit

The invention claimed is:

1. A traffic control system comprising:

an identification unit configured to identify a vehicle falling under a predetermined condition that has been set;

a position control unit configured to set a relative position between the identified vehicle and a surrounding vehicle around the identified vehicle based on a relative distance between the identified vehicle and the surrounding vehicle; and a control unit configured to generate control information for controlling movement of at least one vehicle according to the relative position, wherein the control unit generates the control information for controlling the movement of the at least one vehicle further according to a determination of a ratio of vehicles falling under the predetermined condition around the at least one vehicle to all vehicles traveling around the at least one vehicle, and wherein the identification unit, the position control unit, and the control unit are each implemented via at least one processor.

2. The traffic control system according to claim 1, wherein the control unit generates the control information for controlling the movement of at least one of the identified vehicle or the surrounding vehicle based on the relative position between the identified vehicle and the surrounding vehicle.

3. The traffic control system according to claim 2, wherein the position control unit determines a characteristic of the surrounding vehicle based on the predetermined condition, and sets the relative position between the identified vehicle and the surrounding vehicle based on the determined characteristic.

4. The traffic control system according to claim 3, wherein the position control unit sets a first inter-vehicle distance when the surrounding vehicle satisfies the predetermined condition, and sets a second inter-vehicle distance when the surrounding vehicle does not satisfy the predetermined condition.

5. The traffic control system according to claim 4, wherein the first inter-vehicle distance is less than the second inter-vehicle distance.

6. The traffic control system according to claim 5, wherein the first inter-vehicle distance and the second inter-vehicle distance are inter-vehicle distances that increase as a legal speed of a traveling road increases.

7. The traffic control system according to claim 1, wherein the predetermined condition is a condition for identifying a vehicle that is not transmitting a message including at least position information of the vehicle.

8. The traffic control system according to claim 1, wherein the predetermined condition is a condition for identifying a vehicle not covered by an insurance.

9. The traffic control system according to claim 1, further comprising:
an evaluation unit configured to evaluate a driving characteristic, wherein
the predetermined condition is a condition for determining whether a driving characteristic that has been preset is satisfied,
the identification unit identifies the vehicle that does not satisfy the driving characteristic based on an evaluation result of the evaluation unit, and
the evaluation unit is implemented via at least one processor.

10. The traffic control system according to claim 1, wherein
the position control unit is further configured to set a travel route of the vehicle, and
the travel route does not include an area in which the ratio of vehicles falling under the predetermined condition to all vehicles traveling in the area is equal to or greater than a preset threshold.

11. The traffic control system according to claim 10, wherein
the position control unit instructs the vehicle traveling inside the area having the ratio equal to or greater than the preset threshold to increase a transmission frequency of information related to a sensor mounted on the vehicle.

12. The traffic control system according to claim 10, further comprising:
an insurance premium calculation unit configured to calculate an insurance premium of each vehicle based on a traveling result of whether the vehicle has traveled inside the area,
wherein the insurance premium calculation unit is implemented via at least one processor.

13. The traffic control system according to claim 12, wherein
the insurance premium calculation unit calculates the insurance premium of the vehicle that has traveled inside the area to be higher than the insurance premium of the vehicle that has not traveled inside the area.

14. The traffic control system according to claim 1, wherein
the predetermined condition is a condition for determining a low-fuel-consumption travel of the identified vehicle, and
the position control unit sets the relative position between the identified vehicle and the surrounding vehicle to a relative position corresponding to the low-fuel-consumption travel.

15. The traffic control system according to claim 1, wherein
the predetermined condition is a condition for determining the identified vehicle that has a value indicating an environment of the identified vehicle equal to or greater than a preset threshold, and
the position control unit changes the relative position between the identified vehicle and at least one vehicle traveling ahead according to the environment of the identified vehicle.

16. A traffic control method, implemented via a computer, the method comprising:
identifying a vehicle falling under a predetermined condition that has been set;
setting a relative position between the identified vehicle and a surrounding vehicle around the identified vehicle based on a relative distance between the identified vehicle and the surrounding vehicle; and
generating control information for controlling movement of at least one vehicle according to the relative position,
wherein the control information for controlling the movement of the at least one vehicle is generated further according to a determination of a ratio of vehicles falling under the predetermined condition around the at least one vehicle to all vehicles traveling around the at least one vehicle.

17. A control apparatus comprising:
an identification unit configured to identify a vehicle falling under a predetermined condition that has been set; and
a position control unit configured to
set a relative position between the identified vehicle and a surrounding vehicle around the identified vehicle based on a relative distance between the identified vehicle and the surrounding vehicle, and
control movement of at least one vehicle so as to achieve the set relative position,
wherein the position control unit controls the movement of the at least one vehicle further according to a determination of a ratio of vehicles falling under the predetermined condition around the at least one vehicle to all vehicles traveling around the at least one vehicle.

18. The control apparatus according to claim 17, wherein the position control unit controls the movement of at least one of the identified vehicle or the surrounding vehicle based on the relative position between the identified vehicle and the surrounding vehicle.

19. The control apparatus according to claim 18, wherein the position control unit determines a characteristic of the surrounding vehicle based on the predetermined condition, and sets the relative position between the identified vehicle and the surrounding vehicle based on the determined characteristic.

* * * * *